(12) United States Patent
Bruce et al.

(10) Patent No.: US 9,249,650 B2
(45) Date of Patent: Feb. 2, 2016

(54) CLEAN SOLAR ENERGY TO ENHANCE OIL AND GAS LOCATION SEPARATOR RECOVERY

(76) Inventors: Wallace Bruce, Pampa, TX (US);
Richard Chacon, Bloomfield, NM (US);
Mark Ray, Pagosa Spring, CO (US)

( * ) Notice: Subject to any disclaimer, the term of this patent is extended or adjusted under 35 U.S.C. 154(b) by 751 days.

(21) Appl. No.: 13/325,743

(22) Filed: Dec. 14, 2011

(65) Prior Publication Data
US 2012/0152517 A1 Jun. 21, 2012

Related U.S. Application Data

(60) Provisional application No. 61/423,367, filed on Dec. 15, 2010.

(51) Int. Cl.
| | |
|---|---|
| E21B 43/34 | (2006.01) |
| B01D 17/04 | (2006.01) |
| E21B 36/00 | (2006.01) |
| B01D 17/02 | (2006.01) |

(52) U.S. Cl.
CPC ............ *E21B 36/00* (2013.01); *B01D 17/0214* (2013.01); *B01D 17/042* (2013.01); *E21B 43/34* (2013.01); *Y10T 29/49352* (2015.01)

(58) Field of Classification Search
CPC ..... Y02E 10/44; E21B 43/24; E21B 43/2401; E21B 36/04; E21B 36/00; E21B 43/34; E21B 43/40; Y02B 10/20; Y02B 40/47; F24J 2/4647; F24H 9/2021

USPC ......... 166/57, 302, 267, 75.12; 392/441, 447, 392/451, 461; 126/573, 600, 634, 651
See application file for complete search history.

(56) References Cited

U.S. PATENT DOCUMENTS

| | | | |
|---|---|---|---|
| 3,960,322 A * | 6/1976 | Ruff et al. .................... | 62/228.1 |
| 4,108,160 A | 8/1978 | Harper | |
| 4,143,814 A * | 3/1979 | Hill, Jr. ......................... | 126/610 |
| 4,174,752 A | 11/1979 | Slater et al. | |
| 4,249,605 A | 2/1981 | Slater et al. | |
| 4,289,204 A | 9/1981 | Stewart | |
| 4,481,109 A | 11/1984 | Stewart | |
| 4,651,539 A | 3/1987 | Coloka | |
| 5,002,657 A | 3/1991 | Botts | |
| 8,701,773 B2 * | 4/2014 | O'Donnell et al. ........... | 166/303 |
| 2011/0005580 A1 | 1/2011 | Vandermeulen | |
| 2011/0247831 A1 | 10/2011 | Smith et al. | |
| 2013/0312411 A1 * | 11/2013 | Newman ...................... | 60/641.8 |

* cited by examiner

*Primary Examiner* — Shane Bomar
*Assistant Examiner* — Wei Wang
(74) *Attorney, Agent, or Firm* — Jackson Walker, LLP

(57) ABSTRACT

A system for providing supplemental or auxiliary heat to a crude oil separator is provided. The system includes a primary circuit carrying a fluid heated by a solar panel and a secondary circuit carrying a fluid heated by heat exchangers engaged with the primary circuit. The secondary circuit includes heat exchangers engaging the separator to provide auxiliary heat. The system may also include a source of off-grid electrical energy, such as a wind turbine and/or photoelectric cell.

12 Claims, 21 Drawing Sheets

VERTICAL TYPE F TREATER

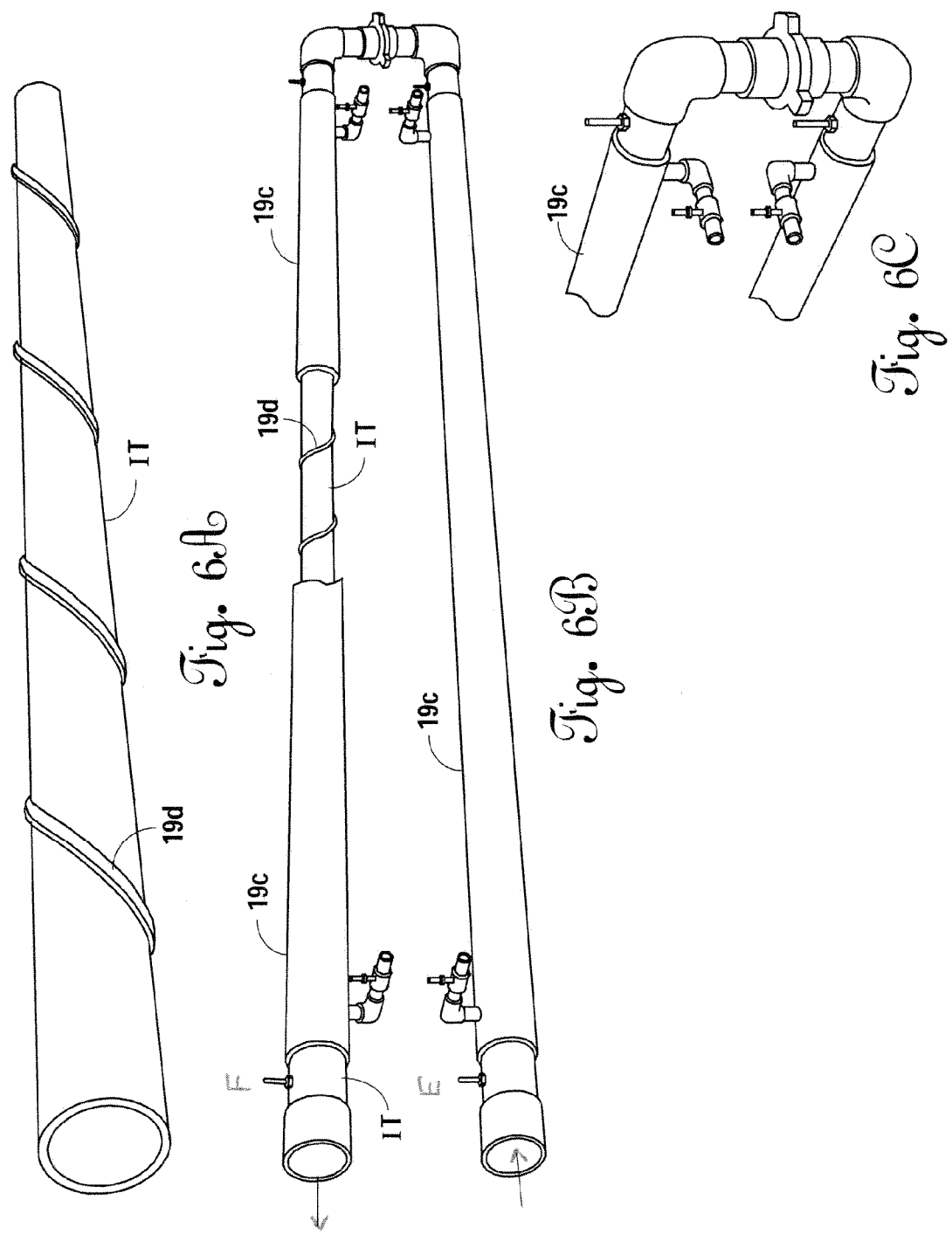

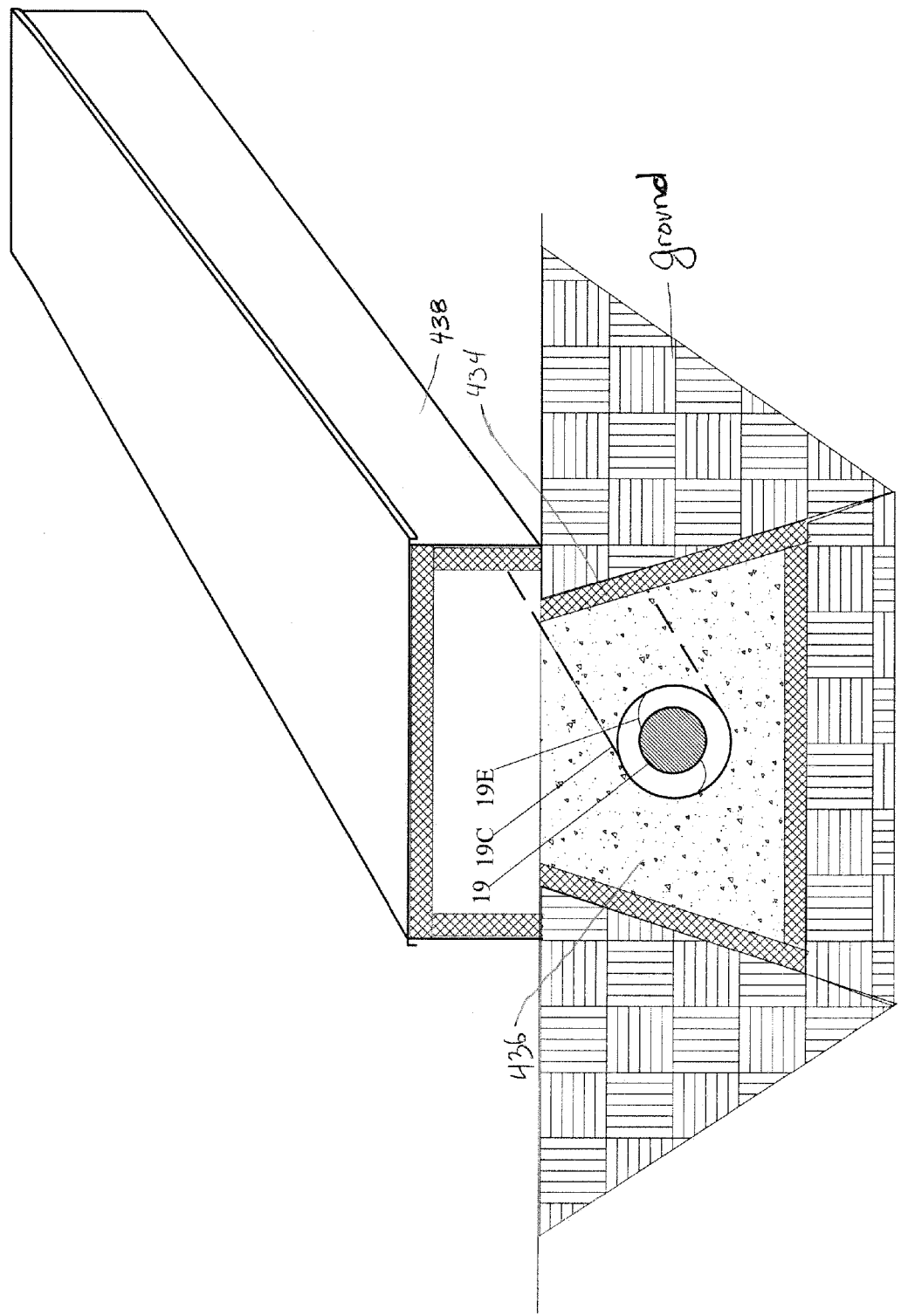

CLEAN SOLAR ENERGY TO ENHANCE OIL AND GAS LOCATION SEPARATOR RECOVERY

This application claims priority from the benefit of and incorporates herein by reference U.S. Provisional Application Ser. No. 61/423,367, filed Dec. 15, 2010.

FIELD OF THE INVENTION

Solar energy to enhance oil and gas site location separator recovery and reduce pollution emission from conventional natural gas powered separators.

BACKGROUND OF THE INVENTION

Product coming out of the ground typically contains oil, but the oil is part of an emulsification comprising oil, dissolved gas, water, and other miscellaneous ingredients. The well owners typically desire transporting only the oil and gas components of the mix for further remote processing, such as at a refinery. It is generally more efficient to remove the oil and gas components from the emulsification or product at the site of the wellhead, and sell the separated oil and gas.

Currently, there are several methods used for the purpose of heating and separating oil, gas, and BS&W (a mixture of debris or basic sediment and water found in the product). The equipment used in this process typically burns natural gas.

Three-phase high pressure gas separators, such as seen in FIGS. 1 and 2 (prior art), are sometimes used. These burn natural gas in a fire tube and typically use fresh water or other suitable fluid as a heat exchange medium between the fire tube and a coil bearing product which is passed over the fire tube and immersed in the fresh water. This three-phase high pressure separator typically is employed at the wellhead site and separates the product received from the wellhead typically as an emulsion into produced water which may be drained off or reinjected, produced oil which may be removed or stored for further processing and sale, and produced gas which may be sold (see prior art FIGS. 1 and 2).

Heater Treaters are also known as low pressure separators and are illustrated in FIGS. 3, 4, and 4A (prior art). Here natural gas fuels a fire box at the base of a vertical column containing product. The dense water settles at the bottom and is drawn off, the gas moving upward in the column is driven out of a stack near the top of the heated inner column (see FIGS. 3, 4, and 4A). FIG. 3 shows a photograph of an in-line heater onsite somewhere in Texas, in conjunction with a water knockout system separator and Heater Treater. FIG. 4 is an illustration of a typical Heater Treater.

There are a number of disadvantages to the current separation methods. These include high fuel cost. Companies spend millions of dollars to separate the product with conventional methods. This also wastes natural resources wherein large volumes of natural gas are burned to keep the fluids heated in the separation vessel. There are also harmful emissions associated with the prior art historical methods of site location separators, including burning gas producing carbon emissions into the earth's atmosphere. Finally, there are safety concerns in that the flame to burn the natural gas may be dangerous and has in the past created conflagrations at the wellhead site, fueled by the product itself.

SUMMARY OF THE INVENTION

Applicants provide an efficient solar powered heater unit with, optionally, wind generation and photovoltaic cells to assist in heating a crude oil product containing oil and gas separator somewhere near the well or wells. Applicants' efficient treating of recovered oil and gas includes in one embodiment a system for heating a product bearing tube, typically containing oil, gas, and basic sediment and water (BS&W) from a wellhead. In another embodiment of Applicants' system, solar power is used to heat a fluid for circulating into an existing separator.

Applicants provide an enhanced separator system to heat the wellhead product which may then be separated in known ways, with or without the use of natural gas. If a prior art natural gas fired separator is used in conjunction with Applicants' enhanced separator system less natural gas is consumed as the wellhead product is pre-heated.

Such a system of using safe, "green" solar heat to increase the temperature of the oil and gas before or after it goes into a gas-fired separator will help eliminate concerns for emissions into the atmosphere as it will reduce and/or eliminate the use of natural gas. Further, it will reduce vapor generation in the separator as the fire tube use will be reduced.

Applicants provide an enhanced, retrofittable separator system which includes a primary heating circuit and a secondary heating circuit. The primary heating circuit includes elements for converting solar energy to thermal energy and for circulating the thermal energy to heating coils, which heating coils engage the secondary circuit. The primary circuit circulates a primary fluid. The secondary circuit circulates a secondary fluid between one or more large heat buffer tanks and an oil heat exchanger or an existing separator that uses the secondary fluid as a heat exchange medium. The heat buffer tank is heated by the primary or first fluid flowing through heating coils immersed in the buffer heating tank of the secondary heating circuit. The buffer tank is large enough to store heat in the secondary fluid in times when the primary circuit does not provide sufficient heat (prolonged periods of cloudiness, for example).

A first pump drives a first or primary fluid through the primary circuit and a second pump drives a second fluid through the secondary heating circuit. The two pumps are controlled by sensors in a microprocessor circuit which controls the heat transfer from the solar collectors to the buffer tank and the buffer tank to the oil heat exchanger.

A system, device, method and kit is provided for preventing waste and increasing the efficiency of oil and gas separator recovery. The system includes a separator having an oil bearing tube, the tube having an inlet and an outlet. The system comprises a primary heating circuit having a primary or first fluid, and a secondary heating circuit, including a heat exchange or buffer tank having a second fluid therein. The heat exchange or buffer tank has a second temperature sensor engaged therewith. The primary heating circuit includes a solar heater having of first fluid therein for receiving radiant heat from the sun. The solar heater has an inlet and an outlet, and a remote heating coil means for removing heat from the first fluid. The remote heating coil means is adapted to engage the heat exchange tank of the secondary heating circuit. A first fluid flow pathway is provided for circulating the first fluid between the solar heater and the heating coil means. A first fluid pump is provided for moving the first fluid through the flow pathways of the primary heating circuit. A second fluid flow pathway includes temperature flow control means engaged with the first fluid flow pathway near the outlet of the solar heater for diverting at least some of the first fluid from the first fluid flow pathway to the second fluid pathway when the temperature of the first fluid near the outlet of the solar heater exceeds a first preselected temperature (for example, about 195° F.). A heat dissipater engaging the second fluid flow pathway is provided for removing at least some of the heat from the first fluid. A first fluid pump control system controls the operation of the first fluid pump, the first fluid pump control system typically comprising of a first temperature sensor near the outlet of the solar heater and a second temperature sensor in the heat exchange tank. The first fluid pump control system further includes means adapted to measure a delta T, or difference in temperature between the two sensors, and means for energizing the first fluid pump when the delta T exceeds a preselected temperature difference value. A third fluid flow pathway engages the first fluid flow pathway, the third fluid flow pathway includes a valve responsive to the second temperature sensor such that when the second temperature sensor reaches a preselected temperature, the valve allows at least some of the first fluid to bypass the remote heating coil means and return the first fluid to the first fluid circuit. The secondary heating circuit is adapted to receive heat from the remote heat exchange coil means of the primary heating circuit and heat the oil in the tube. The secondary circuit includes the heat exchange or buffer tank. The heat exchange or buffer tank has an inlet and an outlet with a secondary fluid flow pathway adapted to place the second fluid in contact with the oil tube so as to heat the oil therein. The secondary fluid flow pathway is configured to engage the inlet and outlet with the heat exchange tank. A pump, engaging the secondary fluid flow pathway is provided for moving the second fluid between the inlet and the outlet. A bypass fluid flow pathway is provided fluidly engaged with the secondary flow pathway, the bypass fluid flow pathway including a temperature responsive valve for diverting at least some of the second fluid such that it bypasses the heat exchange tank.

BRIEF DESCRIPTION OF THE DRAWINGS

FIGS. 6A, 6B, and 6C are illustrations of elements of Applicant's novel tube-in-tube oil heat exchanger with a turbulator.

FIG. 14 illustrates an in-ground installation of elements of Applicants' system.

DETAILED DESCRIPTION OF THE PREFERRED EMBODIMENT

Figure 5:
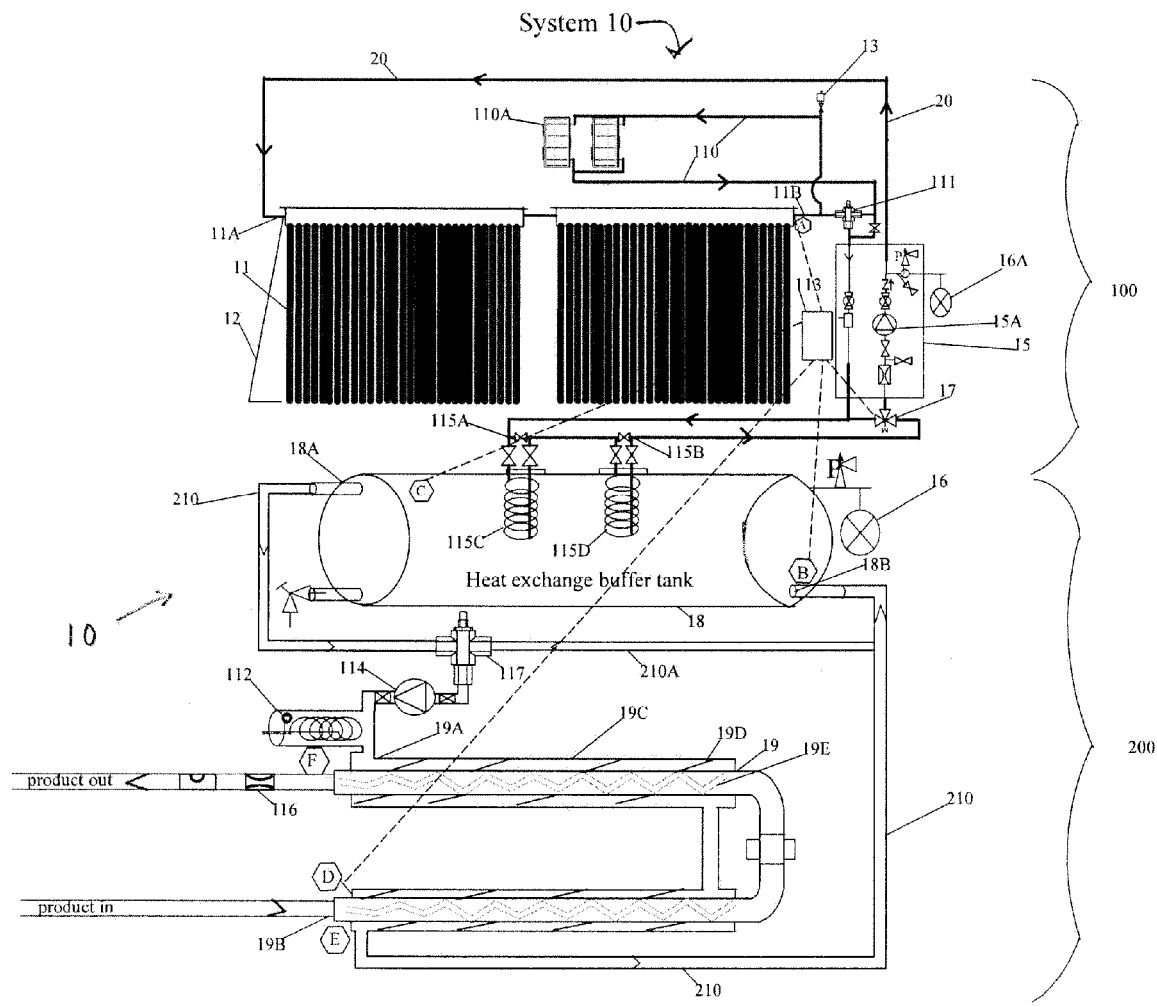
FIG. 5 is an illustration of Applicant's novel enhanced separator system showing the major components thereof.

Turning to FIG. 5, an enhanced separator system 10 is provided for preventing waste. The system 10 in one embodiment includes an oil heat exchanger 19 having an oil bearing inner tube IT for use in conjunction with an existing, typically prior art separator.

A primary heating circuit 100 is disclosed. The primary heating circuit 100 includes a solar collector 11 (having one or more panels) mounted on a solar collector frame 12. A primary or first fluid FF (such as water, a synthetic heat transfer fluid, such as Syntherm A-32 or glycol) in the primary heating circuit 100 receives radiant heat from the sun at the solar collector 11. The solar collector 11 has an inlet 11A and an outlet 11B. A heating coil means, which may be a solar heat exchanger 115C/115D, transfer heat from the first fluid FF to the second fluid SF found in buffer tank 18. The remote heating coil means 115C/115D is immersed in a heat exchange buffer tank 18, which contains a secondary or second fluid SF, for example glycol or a synthetic oil. The function of the primary heating circuit is to provide heat to the SF in the heat exchange buffer tank 18. While two remote heating coils are shown, more could be used as needed. Further, more than one buffer tank may be used.

A first fluid flow pathway 20 consists of an out and return circuit between the solar collector 11 and the heat exchange buffer tank 18 which circulates the first fluid FF between the solar collector 11 and the remote solar heat exchanger 115C/115D. The heat exchange buffer tank 18 may be cylindrical. In one embodiment, the heat exchange buffer tank is cylindrical, 24 inches high, 10 feet long, and made of ⅜ inch steel (see FIG. 7A). A first fluid pump 15A moves the first fluid FF through the flow pathways of the primary heating circuit 100. A suitable pressure relief valve may optionally be included in the primary heating circuit.

A second fluid flow pathway 110 comprises a heat dissipation fluid flow pathway engaging a heat dissipater 110A, including temperature responsive flow control means, such as a Tempmatix® solar tempering (proportional) valve 111 engaged with the first fluid flow pathway 20 typically near the outlet 11B of the solar collector 11. Valve 111 is for diverting at least some of the first fluid FF from the first fluid flow pathway 20 to the second fluid pathway 110 when the temperature of the first fluid FF near the outlet 11b of the solar collector 11 exceeds a first preselected temperature (for example, about 195° F.). Heat dissipater 110A engages the second fluid flow pathway 110 and removes at least some of the heat from the first fluid FF when an over temp condition occurs near the outlet 11B of the solar collector.

A first fluid pump module 15 controls the operation of and includes the first fluid pump 15a. The first fluid pump module 15 comprises the first temperature sensor A near the outlet 11b of the solar collector 11 and the second temperature sensor B in the heat exchange buffer tank 18. The first fluid pump module 15 further comprising means, such as multiple differential temperature control 113, adapted to measure the delta T, or difference in temperature between the two sensors A and B. Energizing the first fluid pump 15A is provided when the delta T exceeds a preselected temperature difference value (example 12-18° F.) and the sensor at the solar panel is hotter.

A three-way motorized electronic valve 17 is responsive to the second temperature sensor B such that when the second temperature sensor reaches a preselected temperature (example 210° F.), the valve allows some or all of the first fluid to bypass the heat exchangers 115C/115D through the solar collector 11 and the heat dissipater 110A. This helps avoid an over temp condition in the buffer tank 18.

A secondary heating circuit 200 includes the heat exchange tank 18 having the second fluid SF therein, the heat exchange tank 18 has a second temperature sensor B and a third temperature sensor C engaged therewith. The second sensor B is placed near the coolest point of the exchange tank 18, typically near inlet 18B, and the third sensor C is placed near the outlet 18A near one of the hottest parts of the heat exchange buffer tank 18.

The secondary heating circuit 200 is adapted to receive heat from heat exchange coils 115A/115B of the primary heating circuit 100 and heat the product in the tube IT of the oil heat exchanger 19 (or to assist in warming a working heat transfer fluid of an existing separator as set forth in more detail below). The secondary heating circuit 200 includes the heat exchange buffer tank 18. The heat exchange buffer tank 18 has inlet 18B and outlet 18A for carrying SF to the oil heat exchanger 19 (or other inlets and outlets as set forth below).

A secondary fluid flow pathway 210 engaging the heat exchange buffer tank 18 is adapted to place the second fluid SF in contact with oil heat exchanger 19 so as to heat the product in the inner tube IT. The secondary fluid flow pathway 210 engages inlet 18B and outlet 18A with the oil heat exchange D.

FIG. 5 illustrates a secondary fluid flow pathway in conjunction with heat exchanger 19 so as to heat the product in the inner tube IT before the product gets to the existing separator. In other words, the secondary fluid flow pathway is used to preheat the crude oil product before it reaches the separator. However, Applicants' secondary fluid flow pathway can operate and function to reduce the use of natural gas by the separator in other ways. For example, in FIG. 10B below, Applicants' secondary fluid flow pathway utilizes heat exchangers wrapped on the outside of the prior art or existing heater treater housing, so as to indirectly (through the exterior walls of the heater treater) heat the fluid contents thereof. In FIG. 10C, a secondary heating circuit (that is one originating from the buffer tank) is seen to circulate through a heat exchanger (that is part of Applicants' secondary fluid flow pathway) inserted into the working fluid (glycol, fresh water or the like, not the crude oil product) of an existing or prior art separator. In FIG. 10D, secondary fluid flow pathway comprises lines that carry the working fluid of a prior art separator into and out of the buffer tank 18. That is to say, the secondary fluid pumped through the buffer tank is the working fluid of the existing or prior art separator. In FIG. 11A, secondary fluid flow pathway includes heat exchangers that are adapted to engage the contents in the interior of a heater treater, which contents are typically not a working fluid, but at least in part, product from the wellhead. That is to say, in FIG. 11A, secondary heating circuit provides for secondary fluid flow pathway through heat exchangers (as part of Applicants' system) that are in direct contact with product.

Turning back to FIG. 5, it is seen that second pump 114, engages the secondary fluid flow pathway 210 and moves the second fluid SF between the outlet 18A, the oil heat exchanger 19, and the inlet 19A of the oil heat exchanger 19 and back to the heat exchange buffer tank 18.

A bypass fluid flow pathway 210A fluidly engages the secondary flow pathway 210. The bypass fluid flow pathway 210A includes a temperature responsive proportional or tempering valve 117 for diverting at least some of the second fluid such that it bypasses the oil heat exchanger 19, when the SF exceeds a pre-selected minimum, for example, 135° to help prevent an overheat condition in oil heat exchanger 19.

FIGS. 6A, 6B, and 6C are various views of the oil heat exchanger 19. This may be a tube-in-tube heat exchanger with the second fluid in the annulus between inner tube IT and outer tube 19C. There are typically two sections, an upper and lower section, and each of the two sections has a novel pipe-in-pipe or tube-in-tube construction. Both sections may be about twelve feet long. The three inch inner pipe or inner tube IT carries the ambient product in from the oil well head and the warmed product out. The 4½ inch casing or outer tube 19C is placed outside the 3 inch pipe and the annulus between the inner and the outer pipe carries the secondary fluid. A twisted spoiler or turbulator 19D is seen in FIG. 6A on the outside of the 3 inch inner tube IT. This turbulator helps generate turbulent flow of the secondary fluid in the annulus between the two pipes to help better distribute heat to the inner pipe containing the product. As seen in FIG. 5, a turbulator of baffles 19e may be used on the interior of inner tube IT to help the efficiency of the heat exchange.

A 1 inch pipe supplies hot glycol or other suitable secondary fluid SF from heat exchange buffer tank 18 to the annulus between the two pipes by engaging outer tube or pipe 19C. Temperature probes E and F may be inserted at the points indicated in FIG. 6C or other suitable points and may electronically control a flow rate control valve 116 located on the inner tube IT, or such flow rate control valve 116 may be manually adjusted. If the temperature of the warm product coming out of the oil heat exchanger 119 is not sufficiently high, product flow may be restricted by flow rate control valve 116 so resident time of the product within the heat exchanger 19 increases.

Figure 7A:
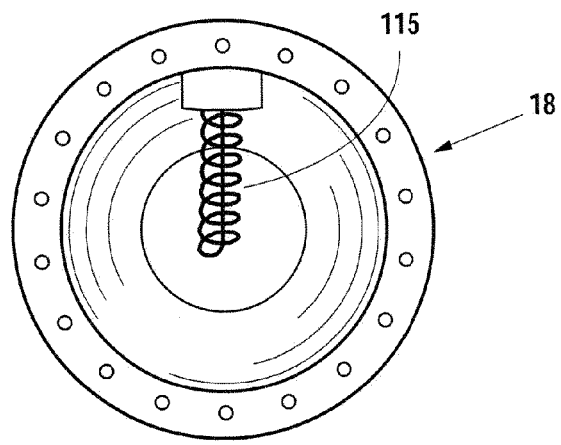
FIGS. 7A, 7B, and 7C are illustrations of elements of Applicant's heat exchange buffer tank and oil heat exchanger showing the heating coils in the heat exchange buffer tank and the insulation on the heat exchange buffer tank and oil heat exchanger.
Figure 7B:
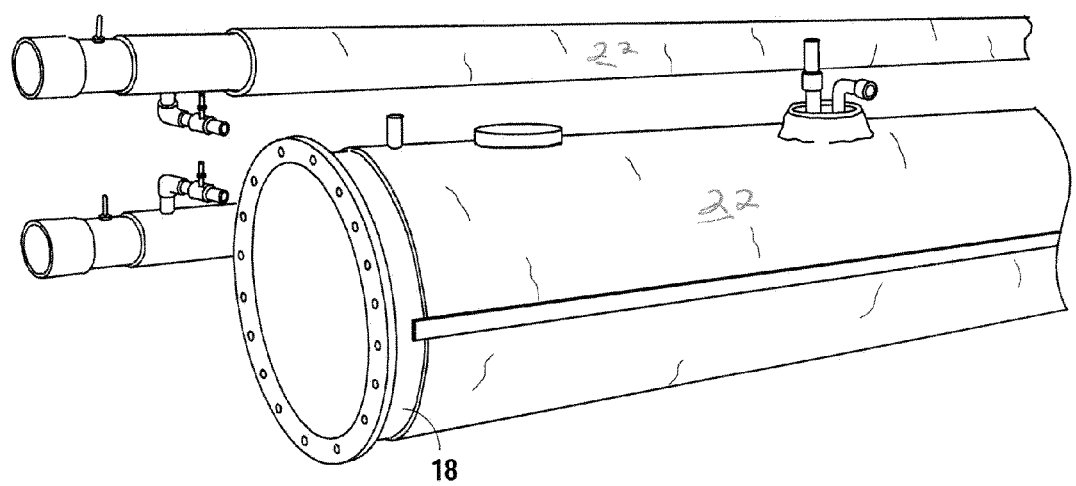
Figure 7C:
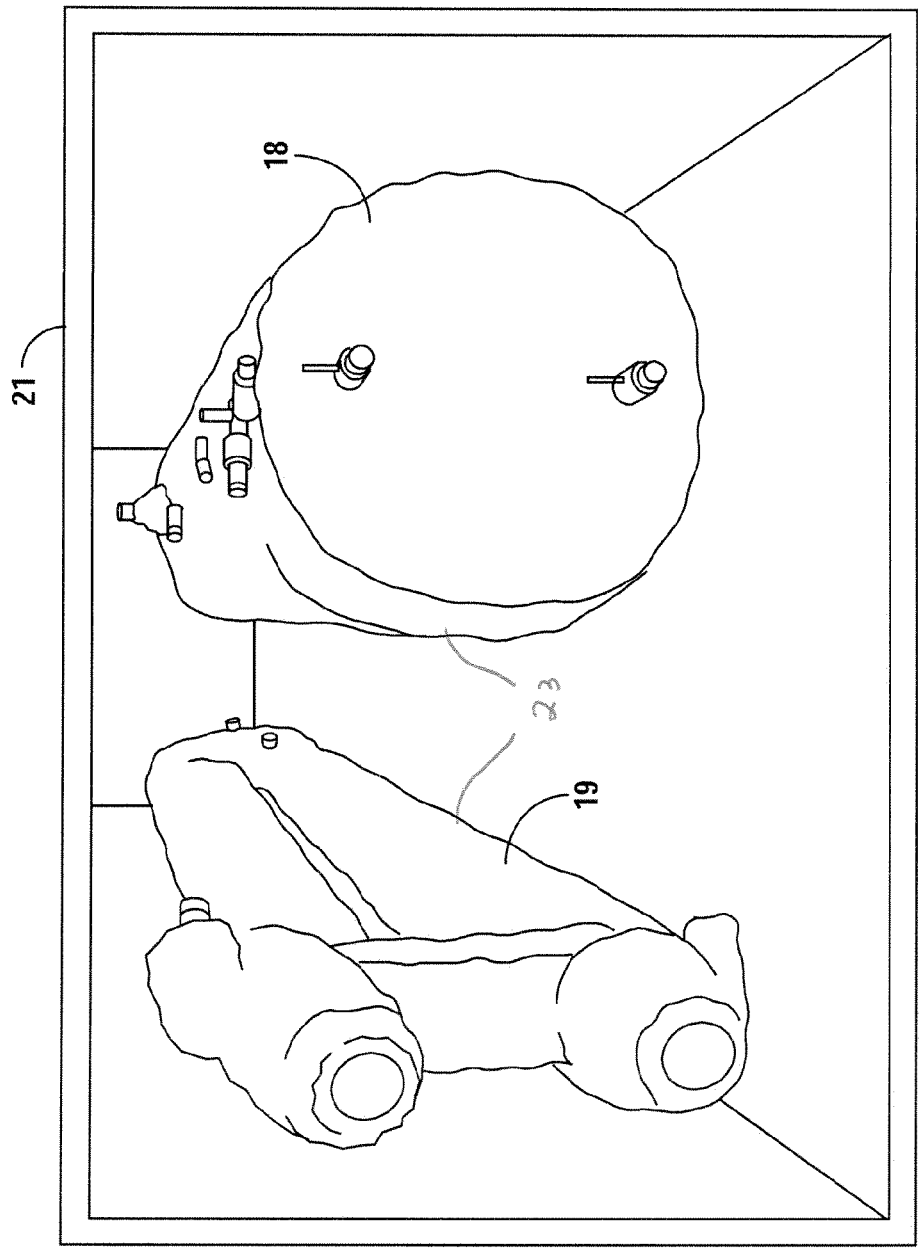

FIGS. 7B and 7C illustrate methods of insulating the heat exchange buffer tank 18. These include wrapping the tank in R13 or other suitable housing configurable insulation with aluminum backing (see FIG. 7B). A second application of insulation may be provided as seen in FIG. 7C. This illustrates a second application of spray 3 to 4 inches thick of cellpolyurethane foam or other spray insulation 23, over the R13 insulation. It has been shown that cellpolyurethane insulation, when directly exposed to flames, will melt, but not burn.

The heat exchange buffer tank 18 may also include an expansion tank 16 with a pressure relief valve P at engaged therewith to allow a receptacle for fluid, such as a glycol second fluid, to expand thereinto. A second expansion tank 16A is placed in the first fluid flow pathway 20 (out and return) typically just downstream of the first fluid pump 15A.

Sensors A, B, C, and D are located as illustrated in FIG. 5. Sensor A measures the temperature of the first fluid just as it leaves outlet 11B of the solar collector 11. Sensors B, C, and D all measure temperature of the second fluid. Sensor C is located adjacent outlet of the heat exchange buffer tank 18, that is, outlet 18A, and is typically about the hottest spot for the second fluid in the system. On the other hand, at inlet 18B where sensor B is located, it is typically the coolest spot for the second fluid in the heat exchange buffer tank 18. Sensor D is typically located at the outlet of the oil heat exchanger 19B where the fluid will be cool. Sensors E and F sense temperature of product and control flow control valve 116, which may be done either manually or electrically. Sensors E and F are for controlling flow valve 116 (permitting greater product flow), high $\Delta T$ opens 116, low $\Delta T$ closes down (restricting product flow). This helps control product out temperature. Low $\Delta T$ will slow down the flow to leave more time for product in the oil heat exchanger.

Sensors A, B, C, and D engage a multiple differential temperature control 113 to control pump 15A valve 17, and pump 114. Sensor F thru controller 113 can energize or de-energize optional backup electrically gas boiler or co-generation heat source. Pump 15A controls the first fluid flow in the primary heating circuit 100 and pump 114 controls the flow of second fluid in the secondary heating circuit 200. When sensors A and B indicate a delta T (temperature difference) between sensors A and B wherein the delta T exceeds a pre-selected temperature (and A is warmer), for example, 16° F., then pump 15A is activated to circulate fluid from the solar collector 11 to the coils 115B/115C. The secondary fluid flow pathway 210 is seen to include (optionally) a thermostatically controlled electric heating coil 112, typically, in one embodiment, just downstream of pump 114 and upstream of inlet 19A to provide backup heat to the product heat exchanger 19, if the solar collector 11 and circuits 100 and 200 are not providing sufficient heat. A high efficiency condensing boiler heated by well gas, by propane or by any other suitable means, or a co-generation element (for example, heat exchanger 432 in FIG. 13) may be used for auxiliary or backup heat in the same manner as the electric heating coil or other auxiliary heater 112. Moreover, any auxiliary heating unit can go into the buffer tank or anywhere downstream the buffer tank in a location suitable to heat the secondary fluid.

When the temperature difference between sensors C and D exceeds a pre-selected temperature difference, for example, 20° (and C is warmer), temperature control 113 activates pump 114 to remove heat from the heat exchange buffer tank and move it to the oil heat exchanger 19.

Solar bypass three-way electrical motorized valve 17 is provided in the first fluid pathway and is controlled by multiple differential temperature control 113. When sensor B hits a pre-selected high temperature (for example, 195°), then the valve shuts off fluid flow to the heat exchange buffer tank 18 and shunts it to heat dissipater 110A. This prevents an over-temperature or over-heat situation in the heat exchange buffer tank 18.

A first tempering valve 111 is provided in the primary heating circuit 100 typically in the position illustrated in FIG. 5 to proportionally control the flow of the first fluid to divert some or all of such flow to the heat dissipater and the rest of such flow to the heat exchange tank as seen in FIG. 5. The first tempering valve may be set at, for example, 195°. When first fluid temperature exceeds that temperature, some of such fluid will be diverted through the heat dissipater 110A.

A second tempering valve 117 may be provided. Regarding the second tempering valve 117, it is used to help control fluid flow through the secondary circuit. It may be set for a temperature range of 110-160°, typically 135° F., and will divert at least some of the fluid which would normally flow through the oil heat exchange 19, back to the heat exchange buffer tank 18 to avoid an overheat condition in the oil heat exchanger 19.

One such temperature control valve is the Tempmatix TS1-4 available from Independent Energy Center, Farmington, N. Mex. (www.iecsolar.com). This valve is fully automatic, pre-calibrated, and requires no electricity. It is capable of withstanding a maximum temperature of about 400° F. and a maximum pressure of about 350 psi. It is designed for use in three-way mixing or diversion applications. This valve automatically and accurately proportions flow in response to fluid temperature. The valve gradually actuates, opens partially at 5° below a set point temperature (for example, 195° F.) and open at 5° above a set point temperature to avoid water hammer effects. Low head resistance allows for high flow rates to accommodate high temperature multi-array systems. Each unit is manufactured for long life and maintenance-free operation.

FIG. 7A illustrates the interior of heat exchange buffer tank 18 with heat exchange or heat exchange coils 115 in the interior thereof. FIG. 7B illustrates that buffer tank 18 may be wrapped in a flexible insulated, wall conforming weather jacket 22 to protect heat loss in the secondary fluid that is contained therein. Oil heat exchanger 19 may also be wrapped in jacket 22. In FIG. 7C, elements of Applicants' system may be at least partially enclosed within a container or box 21 and, thus rendering Applicants' system being modular in nature. At least some of the main components here, buffer tank 18 and oil heat exchanger 19, covered with insulation place inside box 21 or other enclosure. In an alternate embodiment of Applicants' modular system, oil heat exchanger 19 is not placed in container or box 21.

FIG. 7B also illustrates the insulation used on the upper and lower tube-in-tube portions of the oil heat exchanger 19. As seen in FIG. 7C, these may also be sprayed with cellpolyurethane over the R13 or other insulation.

Figure 8A:
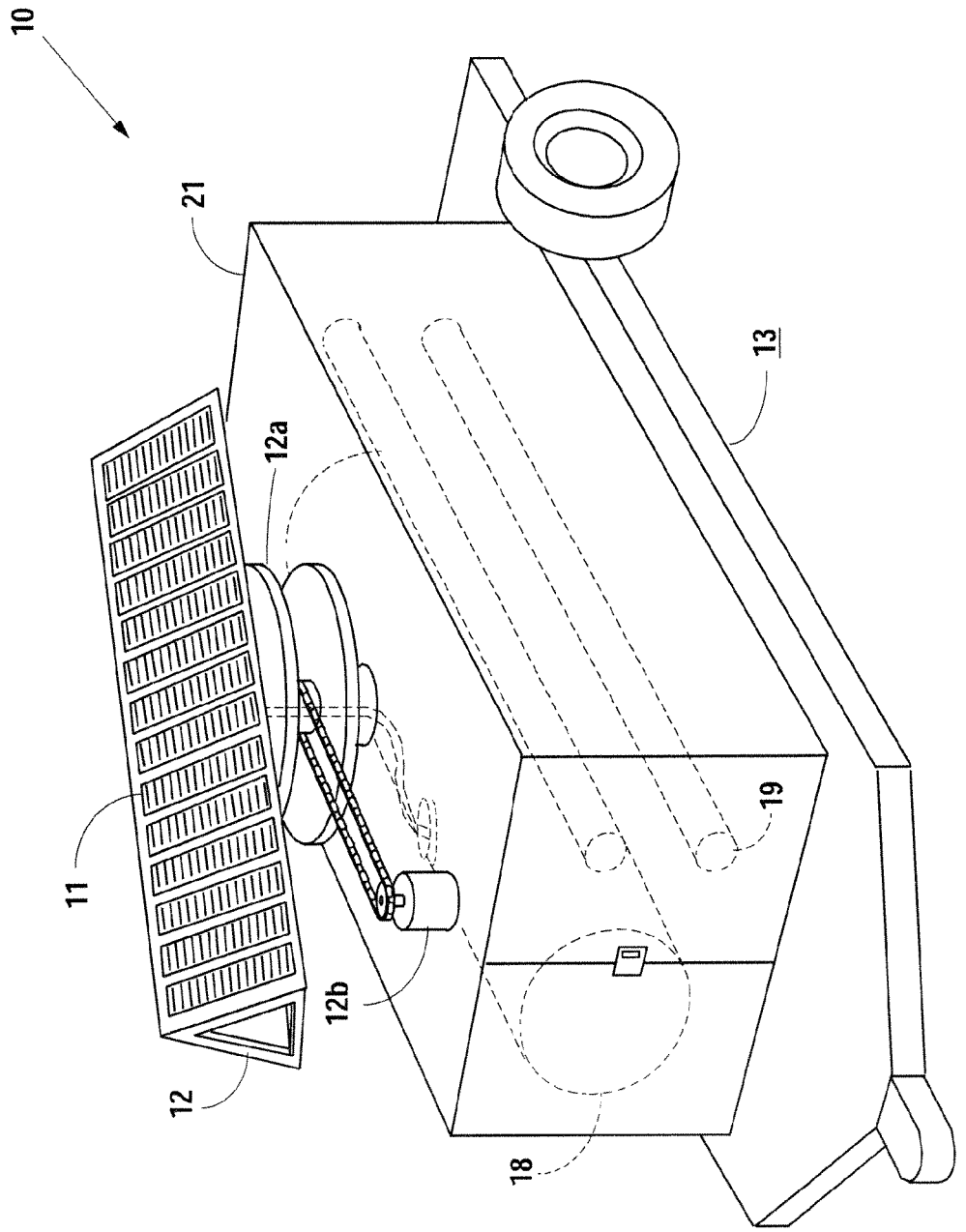
FIGS. 8A and 8B are illustrations of elements of the frame and carousel, as well as the solar collector portions of Applicant's system.

FIG. 8A illustrates that solar panel 11 may be mounted to the top of box or other enclosure 21, which itself may be mounted on a skid (not shown) or trailer 13. Enclosure 21 may include a top wall in which a carousel 12a driven by a motor M and electronics as known in the art of solar collectors is provided so that the solar panel may track the sun. Using Applicants' mobile mount, such as a trailer 13, as well as Applicants' system at least partially "modular" as by enclosing in a box or other enclosure 21 provides for ease and movement of the parts and elements of the system at the well site.

FIG. 8A illustrates solar collector carousel 12A on which one or more solar collectors 11 may be mounted. A carousel provides rotational movement, typically continuous, for following the sun's movement through the day to maximize the energy accumulation of the solar collector from the sun. Solar collector carousel 12A typically includes a frame 12 on which the solar collector or panel is mounted. Additional elements of the carousel may include a timer and a motor to impart rotation to the base.

Fixed collectors may be used and a preferred type of fixed collector is the evacuated tube style collector illustrated in FIG. 5. While two panels are illustrated, more may be used depending on the weather conditions at the site, the type and amount of oil produced, and other factors.

A multi-axis carousel or other rotation device may be used in conjunction with the solar panels. A multi-axis or dual axis assembly will track the movement of the sun from morning to evening and also seasonally adjust the tilt angle of the solar panels. While a tube style collector is illustrated, any other suitable collector, including a flat plate collector, such as those manufactured by Heliodyne or A.E.T. are also suitable.

Figure 8B:
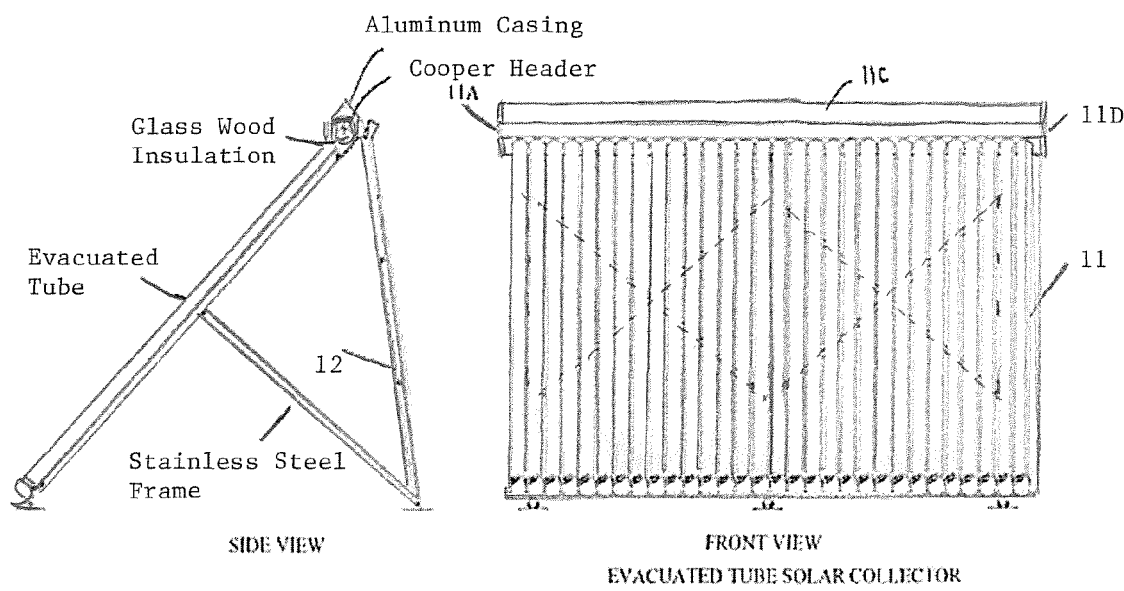

Any suitable solar hydronics may be used. One solar collector that is used in a preferred embodiment is constructed of two Apricus AP-30 solar panels mounted to the solar carousel 12A at an angle of between about 13-57° (see FIG. 8B) and run in series as illustrated in FIG. 5. Each of the two AP-30 panels consist of 30 solar tubes 11d, which may be evacuated tubes placed parallel inside a 439 grade stainless steel frame. The tubes are connected to a copper header 11c that is concealed within an aluminum casing. Glass wool or other insulation surrounds the copper header 11c, which copper header 11c engages and is in fluid communication with inlet and outlet 11A and 11B (see FIG. 8B). In using the Apricus AP-30, a glycol water or other suitable solution is typically used as the first fluid for circulating between the copper header and heat exchangers 115C/115D, hereto which are immersed in the heat exchange buffer tank.

Heat exchangers 115C/115D may include balance valves 115A/115B as indicated between the inlet and outlet of each of the two used as illustrated. By a partial shutting down of 115A, some of the fluid will flow through the first heat exchanger 115A and some will flow to the second 115B. Both 115A/115B are normally closed, but are used for maintenance (when coils need to be replaced).

Figure 9:
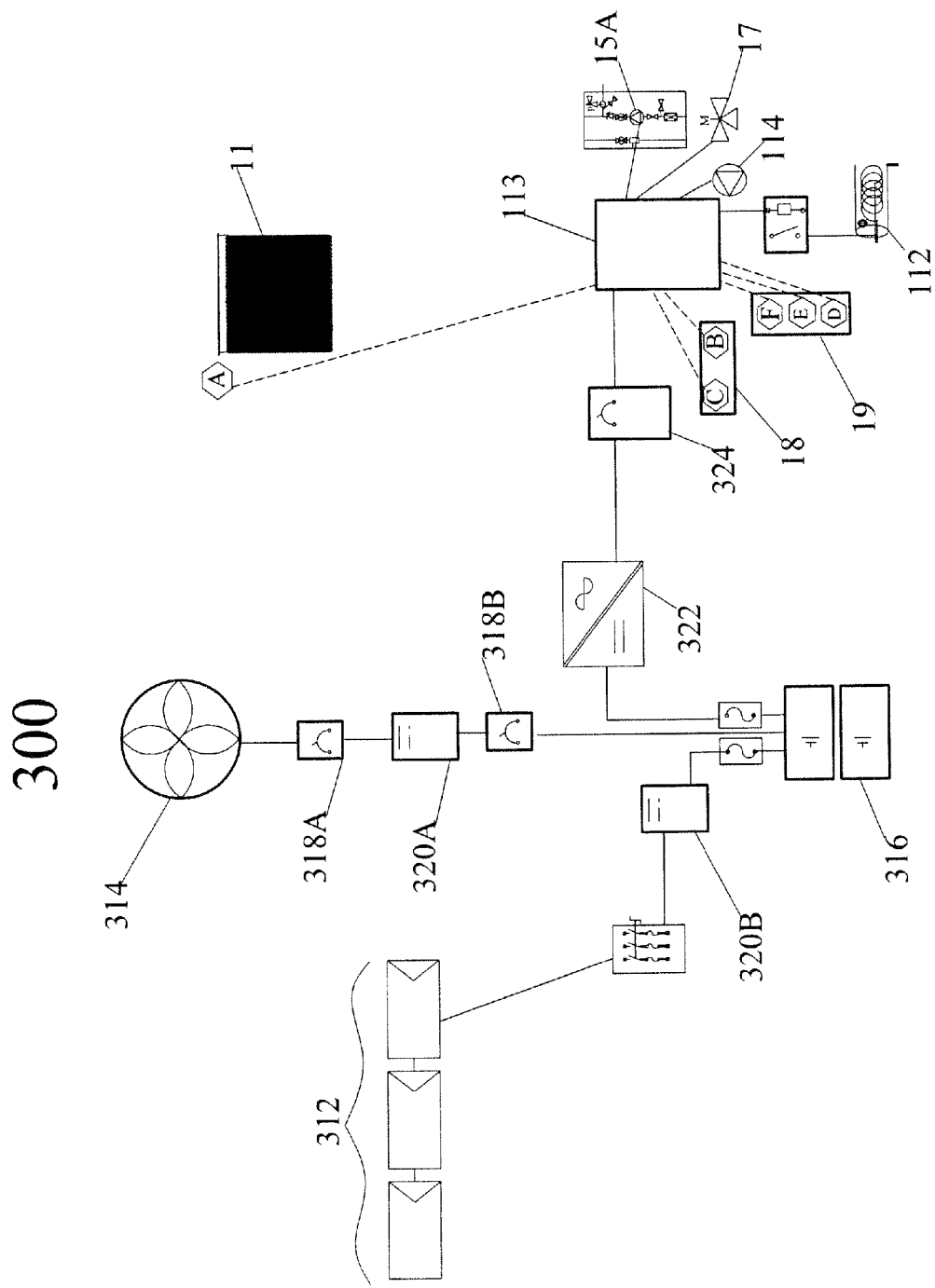
FIG. 9 is an illustration showing the main components of a unit providing 120 volt AC output for use with Applicant's enhanced separator system

FIG. 9 illustrates G-SWEH (or auxiliary electrical energy unit) Unit 300. G-SWEH Unit 300 uses green energy, namely, solar and/or wind energy, to provide an efficient electricity generating unit for use in conjunction with Applicant's system especially when "off grid."

G-SWEH may include photovoltaic cell array 312, which may include one or more panels to convert solar energy to AC output for power components of enhanced separator system 10. A DC wind generator 314 may be provided to power a set of DC batteries 316. Batteries 316 may be a pair of 245 amp hour, 24 volt DC configured for 5880 watts total power. Fuse or circuit breakers 318A and 318B may be provided between the DC wind generator 314 and a first controller 320A. A fuse or circuit breaker 318B may be provided between the DC wind generator 314 and the batteries 316. The charge controller will help prevent an overcharging condition. Charge controller 320A, such as a 60 amp charge controller, will help control charge fluctuations. Charge controller 320B may also be provided between the photovoltaic cell array 312 and batteries 316. In both cases, charge controllers 320A/320B are typically adapted to increase the photovoltaic array power yield through active cooling and intelligent software controller thermal management cooling. The charge controllers may step down a higher voltage solar array or wind generator to recharge lower voltage batteries. The use of circuit breakers and charge controllers will help prevent battery overcharge. In a preferred embodiment, a DC wind generator may be provided, but an AC wind generator may be used with a rectifier.

Batteries provide DC output to an inverter 322 that may provide AC output to an AC disconnect 324. Typically, the energy provided by G-SWEH Unit 300 will provide power to the delta T controller 113, the solar bypass motorized valve 17, and pumps 15A and 114. The G-SWEH Unit 300 is especially useful when enhanced separator system 10 is off the electrical grid, but may be incorporated on grid and drive excess electrical energy back to the grid.

The photoelectric array may be made up of solar panels from Mage, such as 230 watt electric solar panels. The DC disconnect is available from Square D, for example, a 20 amp DC HD disconnect fuse. Fuses are available from Ferraz Shawmutt, for example, a 15 amp type R. The charge controllers are available from Outback Power. Batteries are available from MK Battery and may be group 8D, 245 amp-hour, agm 12 volt. The inverter may be a 600 watt 24 volt DC inverter and Square D may also provide the AC disconnect (for example, 15 amp).

Solar collector components of the enhanced separator system 10 are available from Apricus as set forth above. IEC may provide the diversion (tempering valves). Apricus may also provide the liquid to air heat dissipaters. A high temperature solar air vent and high temperature isolation valves (see FIG. 5) are available from Caleffi. Three speed storage to heat exchange pump unit may be a 120 volt AC pump available from Taco. Taco may also provide 1½ inch flange kits with iso valves and Apricus may also provide high angle collector frames.

Figure 9A:
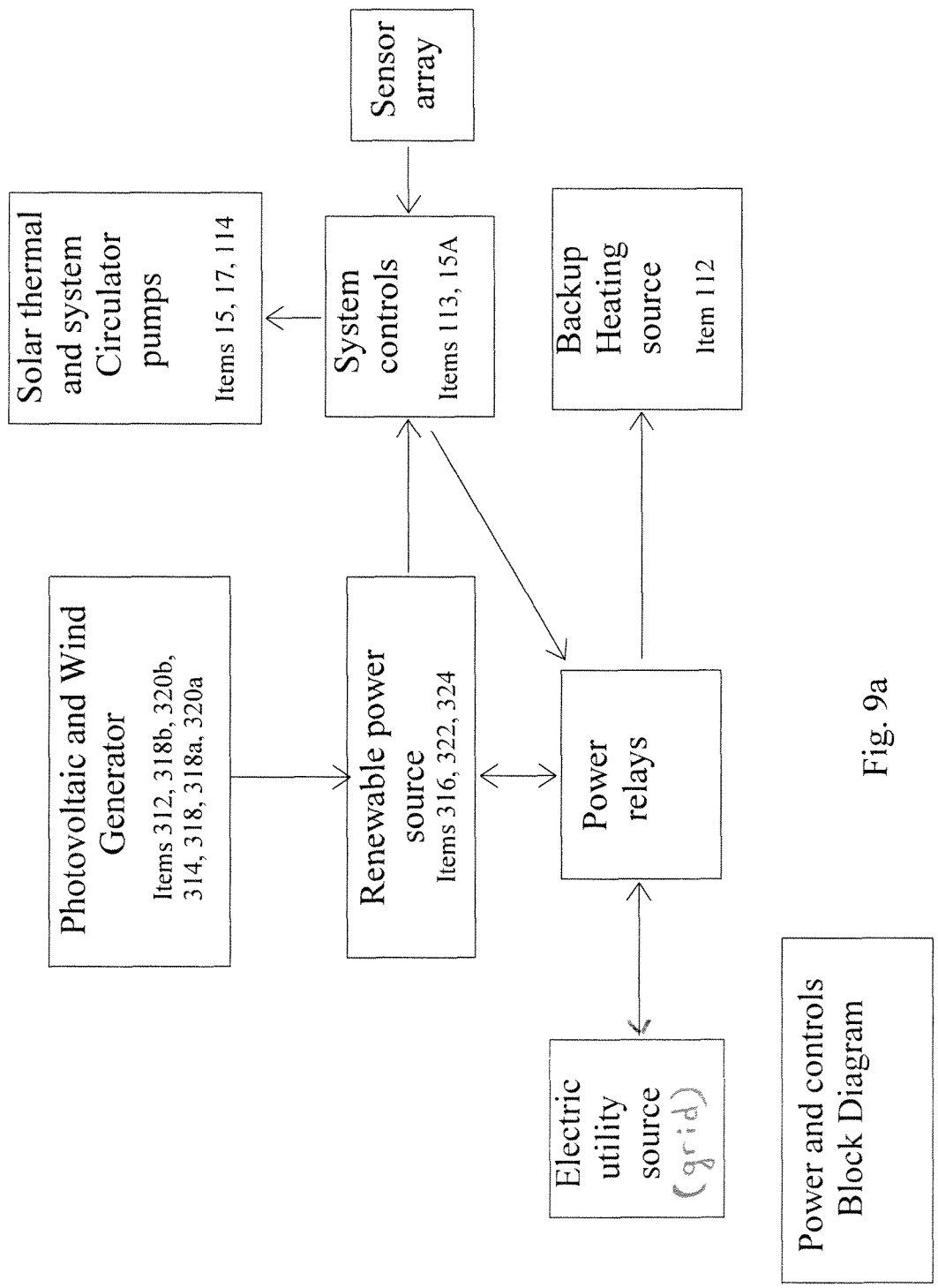
FIG. 9A is a schematic drawing of the manner in which the various elements of Applicants' system engage one another.

FIG. 9a illustrates various components, in schematic flowchart, in block diagram form of the engagement of the power and controls of Applicants' system. An electrical utility source "on grid" engages an array of power relays which in turn power Applicants' backup heating source element 112 and/or system controls 113/15a. Controls are responsive to the sensor array as further described elsewhere in this specification. The system controls circulation and provides heat transfer between the solar panel and the buffer tank, and the buffer tank elements engaged therewith. Off-grid photovoltaic and/or wind generators may provide renewable power to engage the power relays and/or the control systems as indicated. It is seen from FIG. 9a that excess energy from Applicants' renewable electrical energy source may be sold back to a utility.

Figure 1:
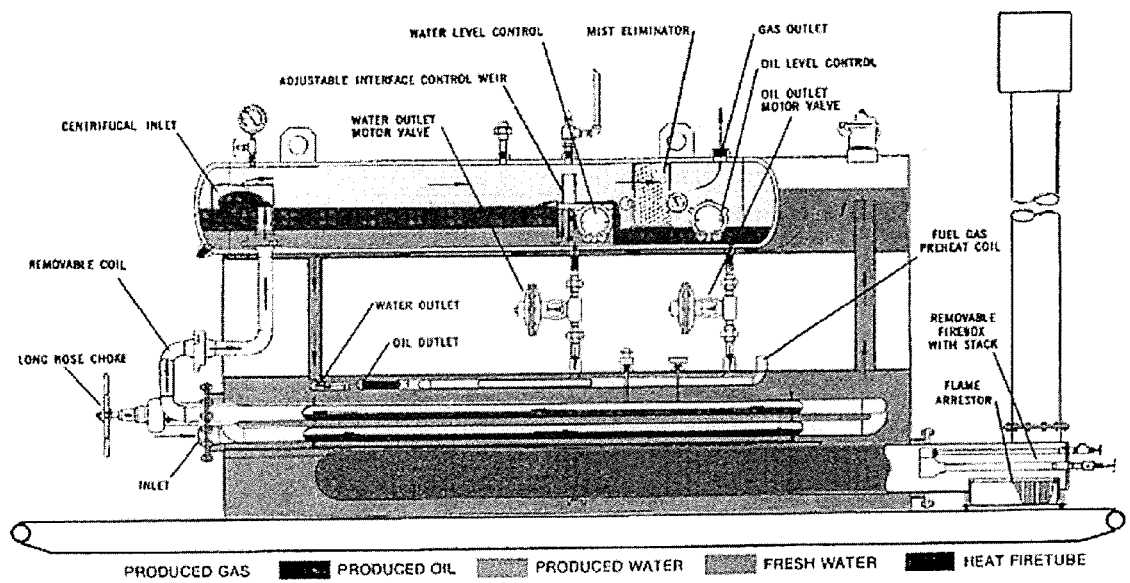
FIG. 1 is an equipment drawing showing a product separator of the prior art.
Figure 2:
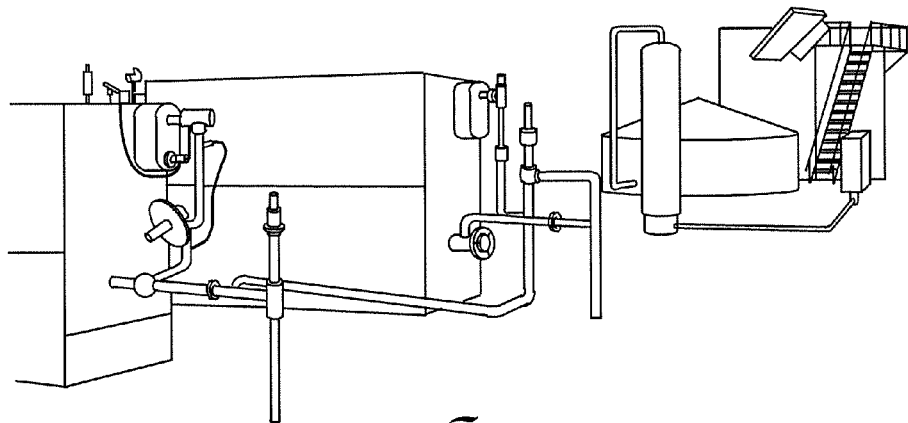
FIG. 2 is a photographic illustration of the prior art separator illustrated in FIG. 1.
Figure 3:
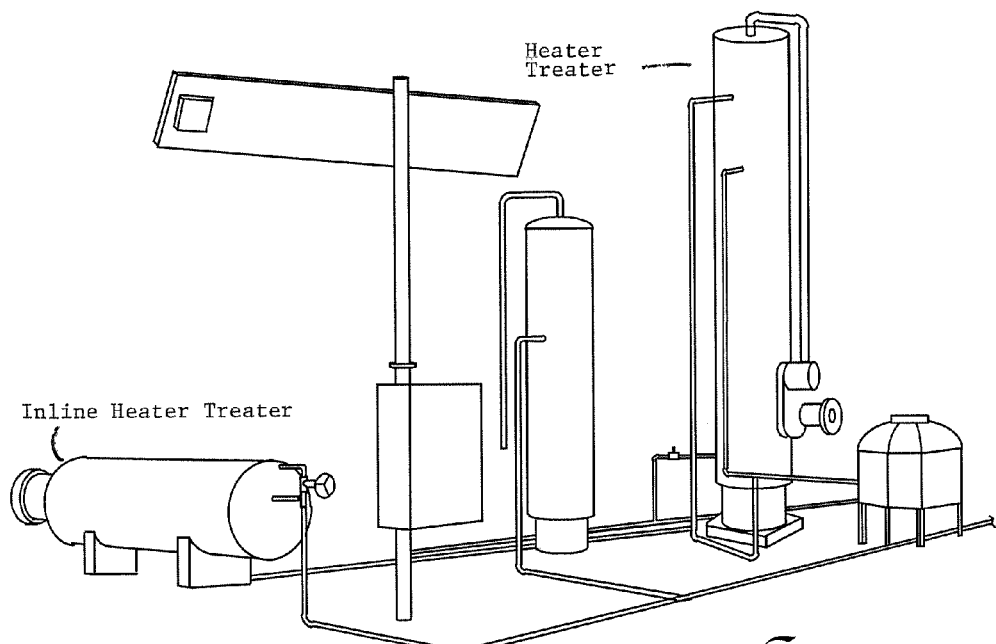
FIG. 3 is a photographic illustration of a prior art inline heater and vertically oriented Heater Treater for use in separating product.
Figure 4:
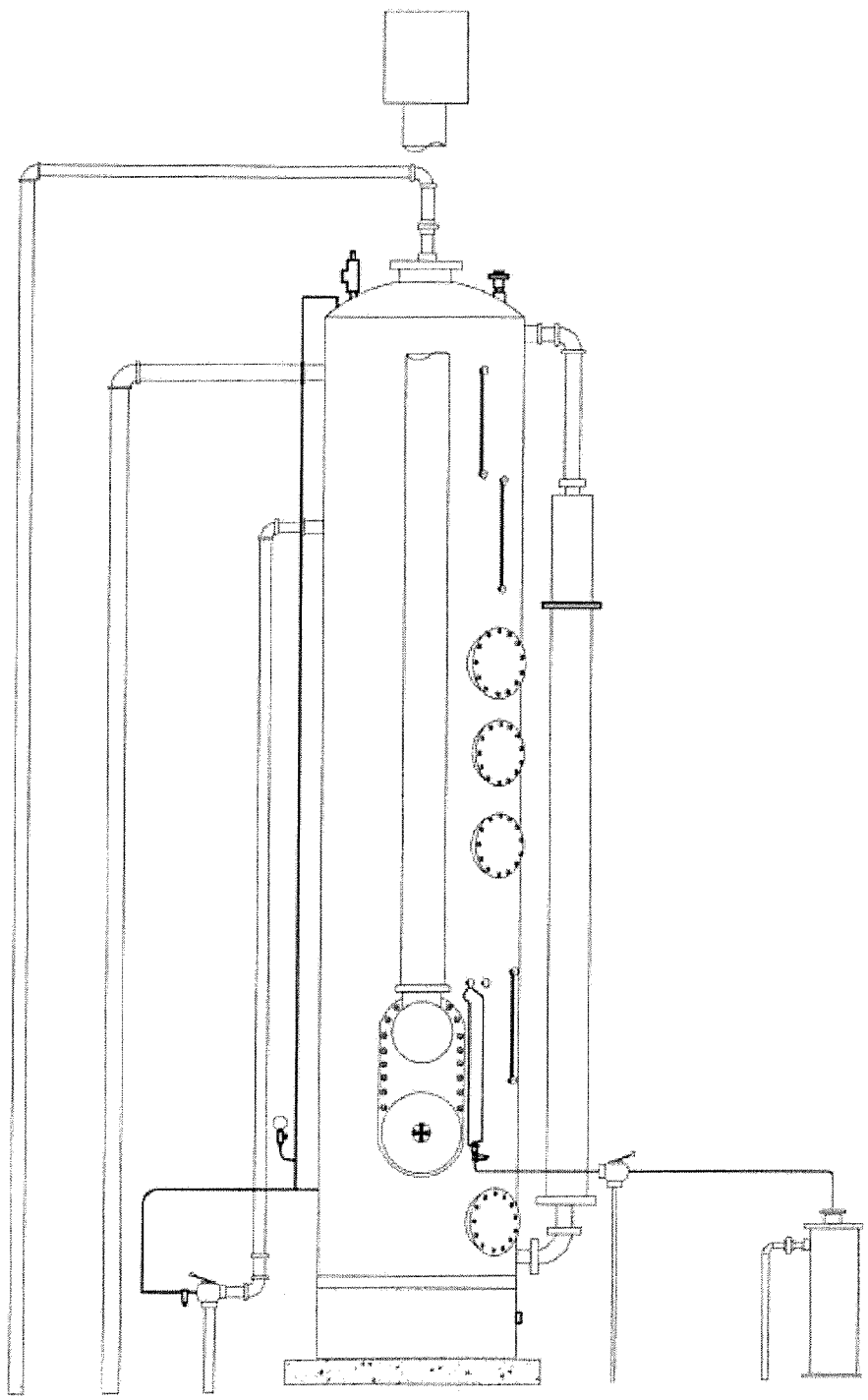
FIGS. 4 and 4A are equipment illustrations showing two types of vertical low pressure product separators of the prior art sometimes called a "Heater Treater."
Figure 4A:
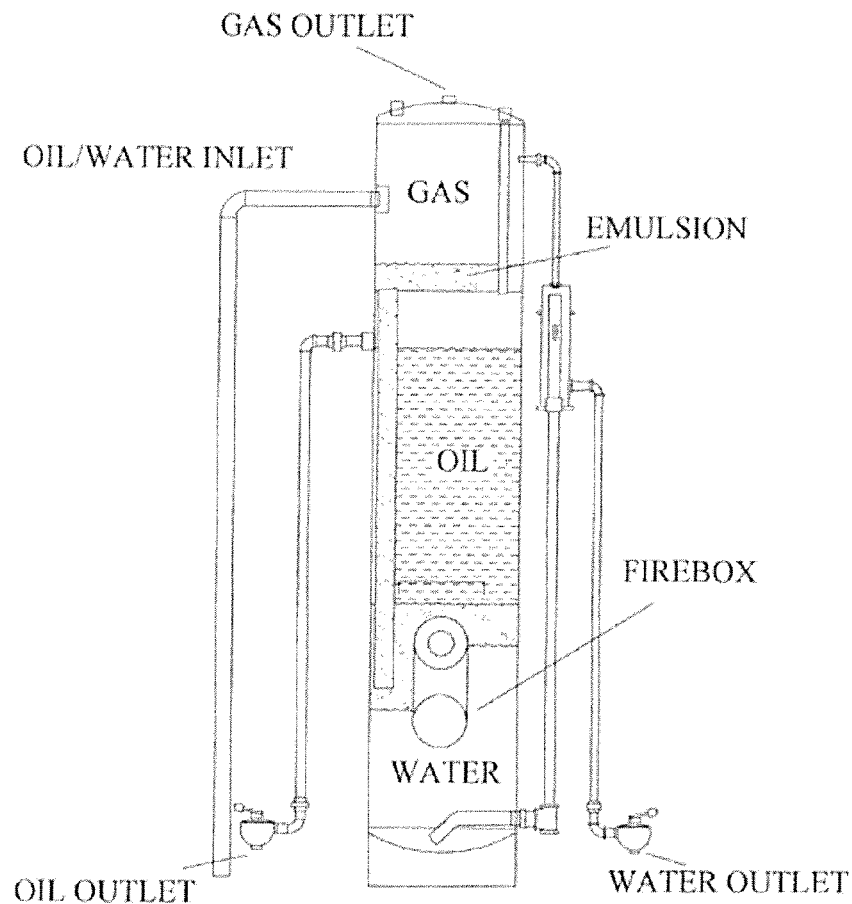
Figure 10A:
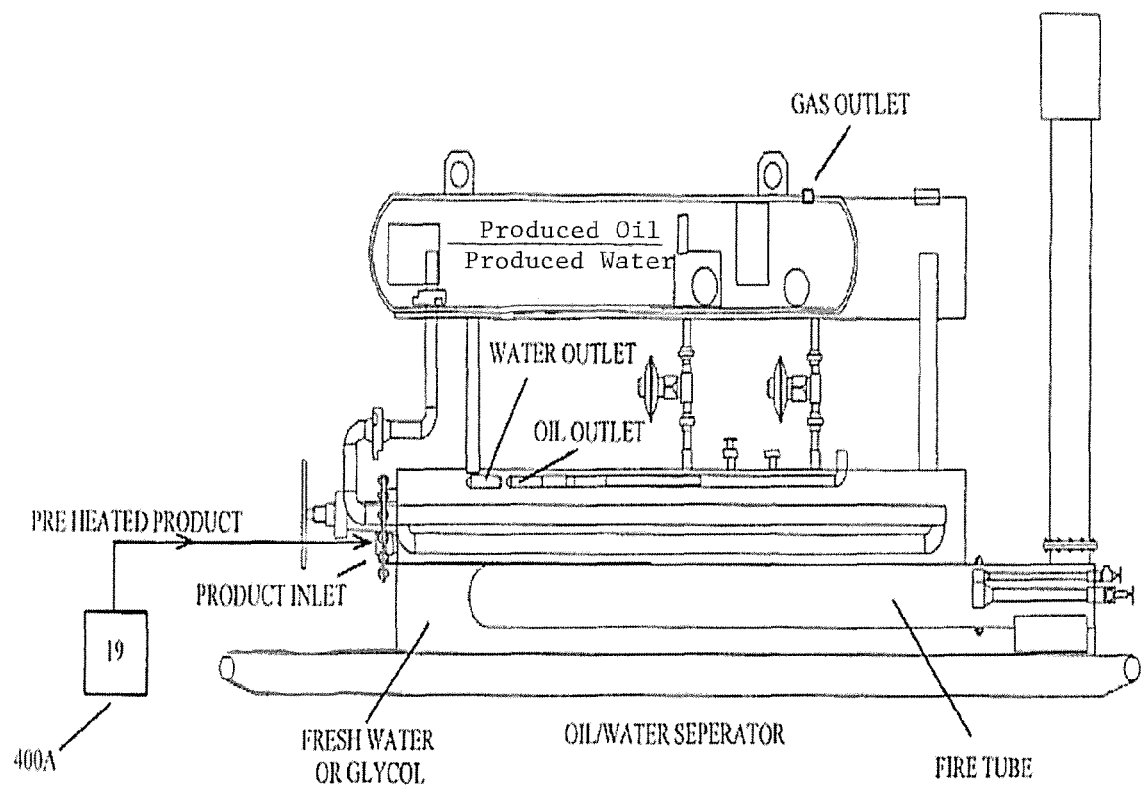
FIGS. 10A, 10B, 10C, 10D, 11A, and 11B illustrate retrofit and conversion of prior art separator systems.

An embodiment of Applicants' system is illustrated in FIG. 10A. FIG. 10A illustrates a prior art system substantially similar to that illustrated in FIG. 1, a horizontal high pressure separator system. However, as seen in FIG. 10A, modification or retrofit 400a is provided to the separator by the "splicing in" of Applicants' oil heat exchanger 19 into the line carrying product from the wellhead to the separator. Preheated product from the outlet of Applicants' product heat exchanger 19 is fed into an inlet (either existing or fabricated) of the prior art separator. That is to say, instead of product coming from the wellhead into the inlet of the prior art separator as illustrated in FIG. 1, Applicants' modification or retrofit 400a preheats the product and feeds it to the inlet as set forth in FIG. 10A. In this manner, the natural gas used to heat the fire tube may be either bypassed entirely or substantially reduced.

Figure 10B:
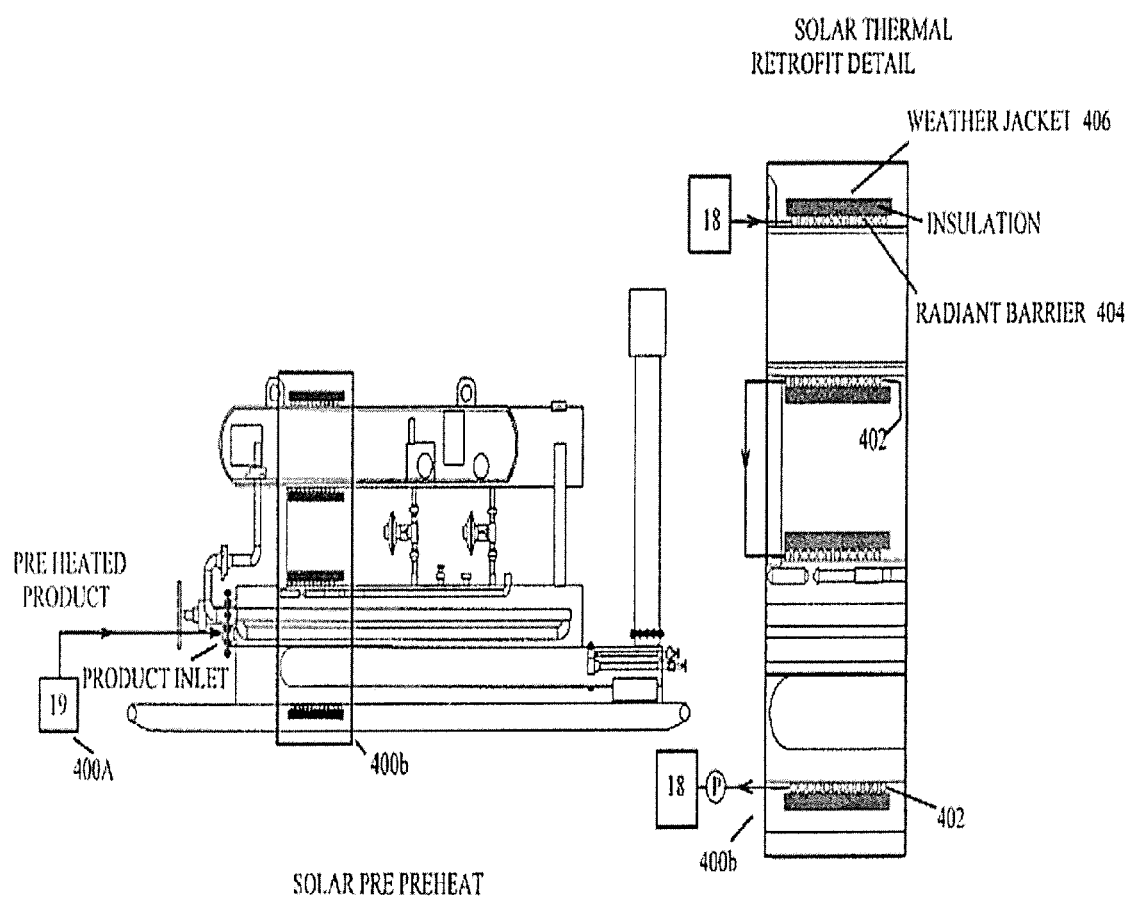
Figure 10C:
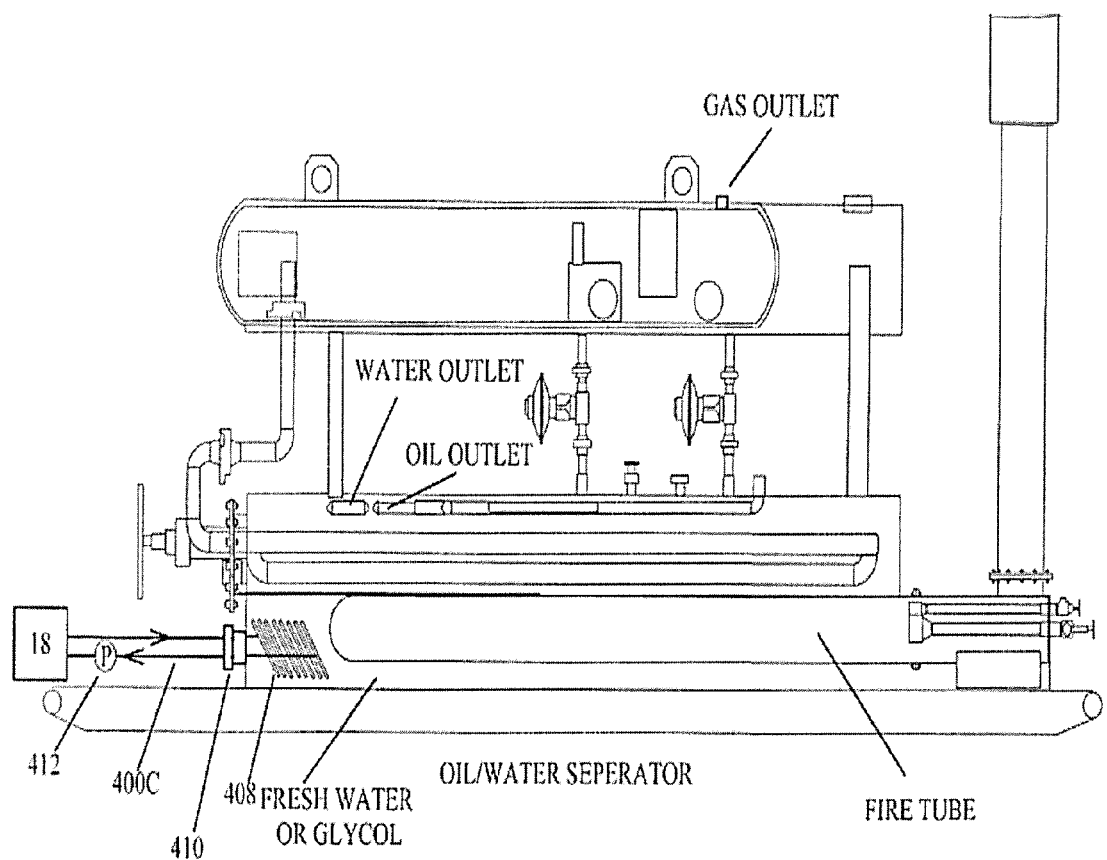
Figure 10D:
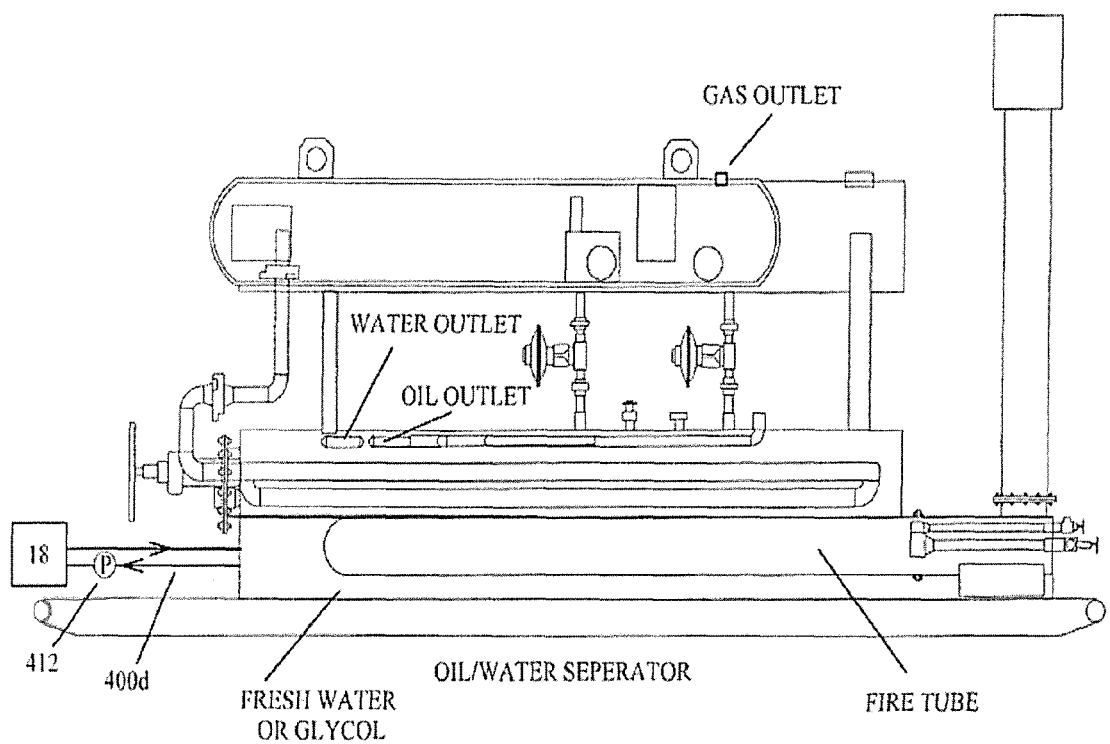
Figure 11A:
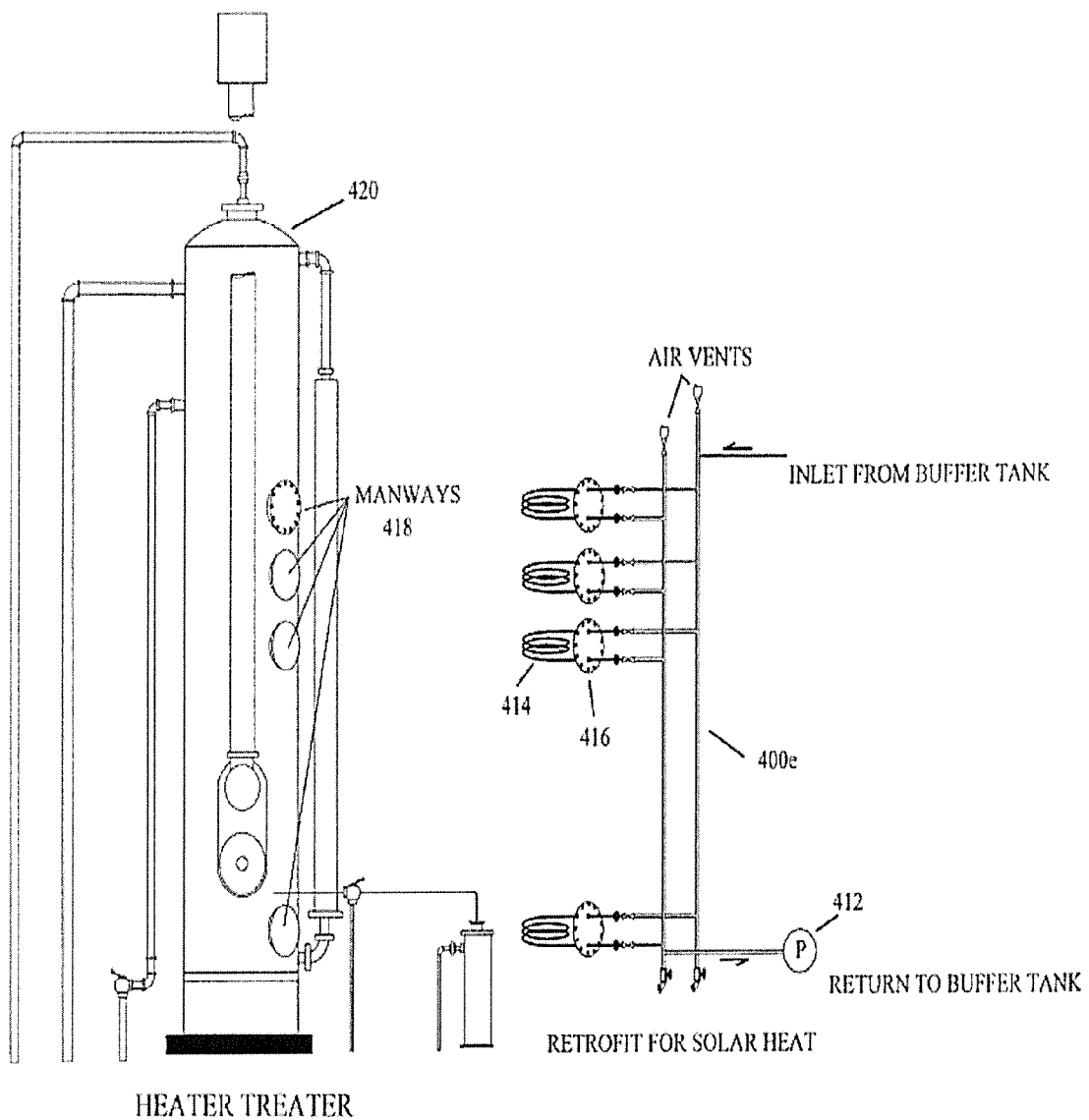

In FIG. 10B, a retrofit or modification 400b is seen showing how secondary fluid from buffer tank 18 is pumped between Applicants' buffer tank 18 and coil tubing 402 wrapping the upper and/or lower sections of the prior art system as illustrated in FIG. 1 to heat the product in the prior art separator. Indeed, tubing 402 may be wrapped around either or both the upper or lower vessels as seen in FIG. 10B and the detail of FIG. 10B, and such coil tubing may be wrapped with a radiant barrier 404 and a weather jacket insulation 406 to help reduce heat loss to the environment. Thus, the heat exchanger carrying the secondary fluid is wrapped around a portion, typically of the outer housing of the prior art separator.

FIG. 100 illustrates heat exchanger modification or retrofit 400c of a prior art separator as set forth substantially in FIG. 1. Here, modification of retrofit 400c includes the addition of exchanger 408, its coil tubes inserted into fresh water, glycol or other heat transfer medium that is provided for in the prior art separator. That is to say, the prior art as seen in FIG. 1 has a fire tube that heats up a working fluid, such as fresh water, glycol or other suitable fluid, which working fluid in turn is in heat exchange relation with product received from the well. Here, product from the well may or may not be preheated as set forth herein, but in the modification or retrofit 400c illustrated heat exchanger 408 is provided so that fluid from buffer tank 18 will heat the working fluid of the prior art separator. Flanges 410 may be fabricated and attached, as by weldment or the like, to the housing or walls of the prior art separator for engagement of heat exchanger 408 therewith. A pump 412 may be provided between the secondary fluid in the buffer tank and the interior of the separator for circulating the secondary fluid therethrough.

FIG. 10D illustrates a modification/retrofit 400d of the prior art separator substantially as seen in FIG. 1, wherein the working fluid of the separator is used as the secondary fluid in Applicants' buffer tank 18 and a pump 412 provided to pump secondary fluid between the interior of the prior art separator and Applicants' buffer tank 18. In the embodiment illustrated in FIG. 10D, the fresh water or glycol of the prior art separator may be heated by both the fire tube when necessary and Applicants' heat exchangers 115 that are immersed in the secondary fluid in the buffer tank.

Figure 11B:
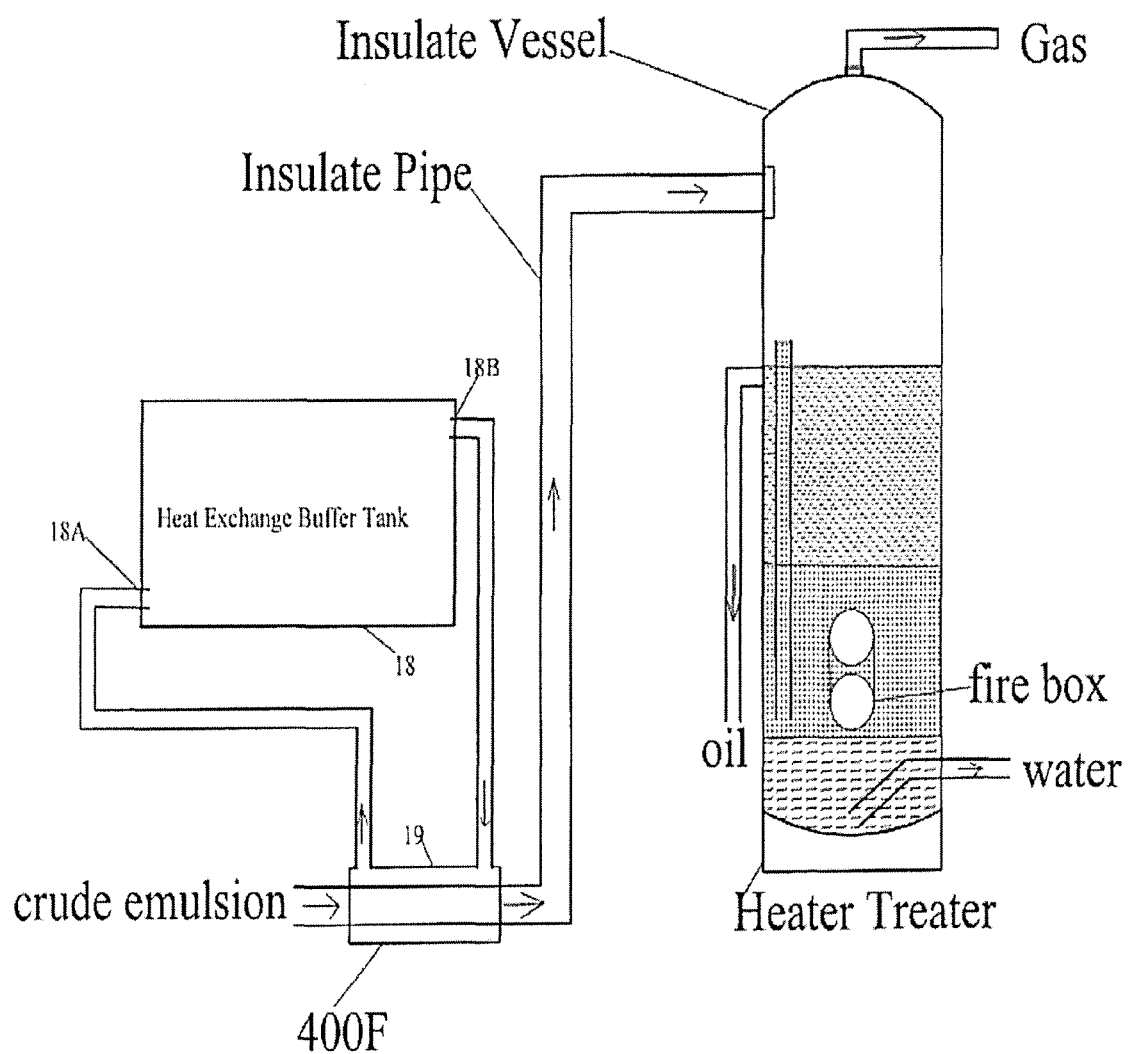

FIGS. 11A and 11B illustrate a retrofit or conversion 400e of a prior art vertical or Heater Treater separator to incorporate elements of Applicants' system. FIG. 11A illustrates modification/retrofit 400e illustrating the use of a series of stainless steel (or other suitable material) heat exchange coils 414 insertable into the inner volume of a vertical column of the Heater Treater to directly heat the fluids (typically product from the wellhead) thereof. Heat exchange coils 414 receive fluid from and return fluid to buffer tank 18. Thus, heat is transferred from buffer tank 18 to the separator contents, typically product, in the Heater Treaters, such as that illustrated in FIG. 11A.

In FIG. 11A, it is seen that heat exchange coils 414 are configured with metal covers 416 that may engage existing manways 418 of the vertical Heater Treater. That is to say, the existing manway covers are removed and fabricated covers 416 provided to engage the fastener holes of the existing flanges on the manways of the Heater Treater. Heat exchange coils 414 are configured to fit through the existing opening of the Heater Treater and into the interior thereof. That is to say, members are provided that retrofit/modify 400e existing structure so as to allow the insertion of one or more heating elements connected, as seen here, for example, in series (or in the alternative, in parallel) to circulate fluid from Applicants' buffer tank 18 through pump 412 to heat the contents, typically fluid product in the interior of the Heater Treater. Insulated jacket 420 may be provided for one or more portions of the outer surface of the housing of the Heater Treater.

In FIG. 11B, it may be seen that preheated product may be provided from Applicants' product heat exchange outlet to the inlet of a vertical type Heater Treater vessel for separation therein. In FIG. 11B, a modification/retrofit 400f of a vertical type Heater Treater as substantially found in the prior art treats preheated product substantially the same way as the modification set forth in FIG. 10A. That is to say, modification/retrofit 400f warms the crude oil product before it is received into the interior of the separator so that less heat is required from the fire tube.

As with the modification/retrofit systems of FIGS. 10A and 10B, those of FIGS. 11A and 11B anticipate the use of either preheated product or product directly from the wellhead (not preheated) with or without the use of heat exchange coils circulating hot secondary fluid from Applicants' buffer tank 18.

Figure 12B:
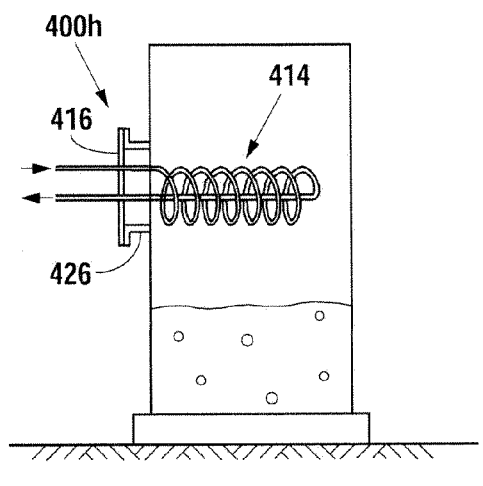
FIGS. 12A and 12B are views of a modification or retrofit to a vertical type separator.
Figure 12A:
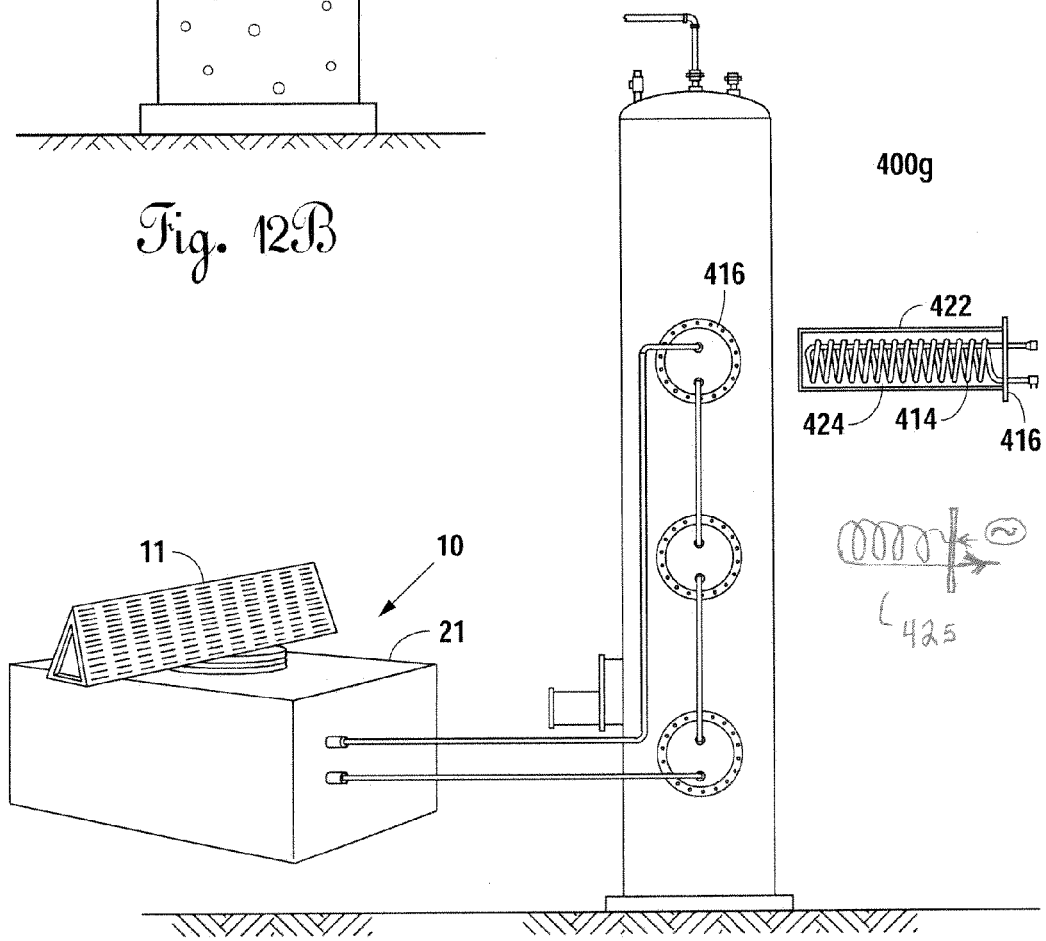

FIG. 12A illustrates secondary fluid from Applicants' buffer tank 18 being circulated through exchange coils 414 similar to those seen in FIG. 11A. One embodiment is illustrated in which a housing 422 is provided to covers 416, the housing containing a working fluid 424, such as glycol or a suitable oil or the like. In the retrofit/modification embodiment 400g illustrated in FIG. 12A, heat exchange working fluid 424 is provided to transfer heat from the warm heat exchange coils 414 to the fluid 424 and through housing 422 to the fluid contents of the interior of the Heater Treater. Housing 422 separates working fluid between coils carrying the buffer tank fluid and the contents of the Heater Treater so as to reduce the accumulation of debris and the like that may occur with the heat exchange coils 414 directly inserted therein, especially where the heat exchanger has a multiplicity of small tubes one adjacent the other. FIG. 12A also illustrates that an auxiliary heat exchanger 425 may be retrofitted or added to a separator in substantially the same manner as the heat exchangers carrying the secondary fluid. However, auxiliary heat exchanger 425 may be an electric coil provided to supplement solar heat exchangers or may be a co-generation heating coil (see FIG. 13) engaged with the housing of the separator so that auxiliary heating coil 425 helps heat the contents of the separator. Off-grid the auxiliary heating coil may be electrical and receive electric energy from Applicants' auxiliary electric unit as seen, for example, in FIG. 13.

FIG. 12B illustrates modification 400h, which comprises fabrication of a flange 426 located on the housing of the vertical Heater Treater. Modification 400h fabricates an appropriate member, such as flange 426, that is welded on the outer wall of the Heater Treater to provide a member for receipt of covers 416 thereon, such as by fasteners or the like, and for locating exchange coils 414 within the interior of the Heater Treater.

As seen in the foregoing illustrations, Applicants provide various structure to engage the buffer tank to pre-heat, and heat directly, or heat indirectly, the contents of a separator so that the use of natural gas will be decreased or eliminated. As part of providing flow in the various applications of the use of the secondary heating circuit 200 for separation of product, pumps 114/412 are illustrated. Flow control or the control of these pumps may be provided with thermal sensors and differential temperature controllers for controlling the pumps and thus the secondary fluid flow. These sensor arrays may be placed so that they engage the secondary fluid or the crude oil product. In one embodiment, temperature differential may control the flow of the secondary fluid. In another embodiment of Applicants' system, flow meters may be used between the producing well or wells and the separator to measure the flow of product into the separator. Such flow meter or flow meters and/or may control the flow of secondary fluid to and out of the buffer tank dependent upon the flow rate of the product, typically providing flow control in the secondary circuit when there is sufficient flow of product to the separator or separators.

FIG. 13B also illustrates that off-grid clean energy means may be provided as seen in FIG. 9 above for supplying energy to the pump, microprocessor, and other elements requiring electricity. Off-grid clean energy means may be modular 429, for the storage batteries and charge controllers thereof.

Figure 13:
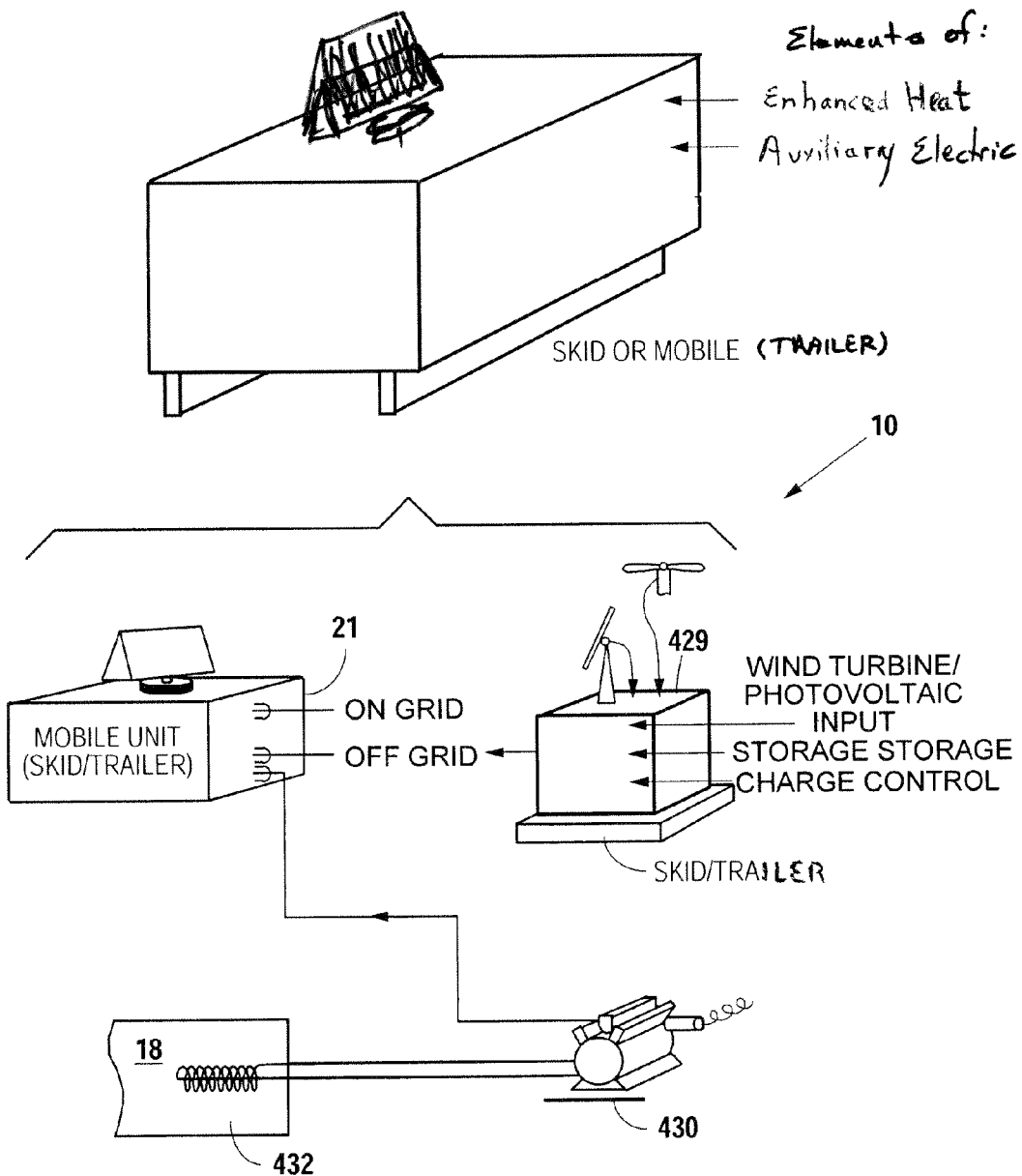
FIG. 13 illustrates the on-grid and off-grid options for powering Applicants' system.

FIG. 13 also illustrates the modular unit may be simply electrically connected "on-grid" where there is a suitable source of electricity at or near the production site. FIG. 13 also illustrates that off-grid application may include an onsite generator 430, such as a diesel or natural powered generator (for example, powered by natural gas from the separator or propane from offsite), for providing electricity. Generator 430 may, either in place of or supplementing the radiator of the engine thereof, have a heat exchanger 432 engaged with the water pump circulating coolant through the engine of the generator so that the waste heat of the generator is at least partially received in the buffer tank to heat the contents thereof.

FIG. 14 illustrates that elements of Applicants' oil heat exchanger 19 may be buried in the ground. If so buried, insulation 434 may be provided, for example, extruded styrene sheets, which insulation will separate the ground from a thermal mass, such as sand 436 (providing thermal mass and constant for expansion and contraction). Above the ground in which Applicants' oil heat exchanger 19 is buried, there may be a shelter cover and service access member 438, which may be insulated, including having a reflective surface on the interior thereof to reflect heat back towards the sand/ground/oil heat exchanger and protect the buried elements from exposure. By burying the oil heat exchanger, which may be a tube-in-tube design, loss may be prevented and sand 436 or other suitable material may provide thermal mass for more effective heat transfer.

Although the invention has been described in connection with the preferred embodiment, it is not intended to limit the invention's particular form set forth, but on the contrary, it is intended to cover such alterations, modifications, and equivalences that may be included in the spirit and scope of the invention as defined by the appended claims.

The invention claimed is:

1. An assembly for heating crude oil product obtained from an oil well at an oil well site to assist the separation of the crude oil product into at least clean oil, water, and gas components, the assembly comprising:
    a separator, the separator including a separator housing, the separator housing defining a separator interior, the separator configured having multiple manway openings, the separator for substantially separating the crude oil product into a water component, a clean oil component, and a gas component, the separator further providing gas removal, clean water removal, and clean oil component removal members engaged with the separator interior, for removing these components from the separator;
    a pipe for carrying the crude oil product from the oil well to the separator;
    a primary circuit, the primary circuit including a solar panel, a first non-water liquid heat transfer medium chosen to maintain a liquid state in the primary circuit, and a primary/secondary circuit heat exchanger, a primary circuit pump, and a first fluid flow pathway, the primary circuit pump for engaging the first fluid flow pathway for circulating the first heat transfer medium between the solar panel and the primary/secondary circuit heat exchanger;
    a secondary circuit comprising a buffer tank adapted to receive the primary/secondary heat exchanger into the interior thereof, a secondary circuit pump, a second non-water liquid heat transfer medium chosen to maintain a liquid state in the secondary circuit, an outlet pipe engaging the buffer tank, and an inlet pipe engaging the buffer tank;
    a first housing having a first housing interior and having a long axis, the first housing having a first housing cover, the first housing dimensioned for receipt through a first manway opening of the multiple manway openings and into the interior of the separator with the long axis of the first housing perpendicular to a vertical axis of the separator housing, the first cover dimensioned to engage the first manway opening; and
    a first heat exchanger dimensioned for receipt inside the first housing;
        wherein the secondary circuit pump circulates the second heat transfer medium through the buffer tank, the outlet pipe of the buffer tank, the first housing, the inlet pipe of the buffer tank, and the first heat exchanger.

2. The assembly of claim 1, wherein the multiple manway openings are aligned one vertically above the other.

3. The assembly of claim 2, further including a second housing, the second housing having a second housing interior and a long axis, the second housing having a second housing cover, the second housing dimensioned for receipt through a second manway opening of the multiple manway openings into the interior of the separator with the long axis of the second housing perpendicular to the vertical axis of the separator; and
    a second heat exchanger dimensioned for receipt inside the second housing;
        wherein the secondary pump circulates the second heat transfer medium through the second heat exchanger.

4. The assembly of claim 3, wherein the first and second housings contain a working fluid in contact with the first and second heat exchangers to help provide heat transfer from the first and second heat exchanger to the interior of the separator.

5. The assembly of claim 4, wherein the separator housing includes a first and a second flanges to engage through multiple fasteners, a first and a second manway covers.

6. The assembly of claim 5, further including a tubing to carry the second heat transfer medium between the first and second heat exchangers.

7. The assembly of claim 6, wherein the tubing connects the first and the second heat exchangers in series.

8. The assembly of claim 6, wherein the first and the second housing are dimensioned to fit through and retrofit an existing separator.

9. An assembly for heating crude oil product obtained from an oil well at an oil well site to assist the separation of the crude oil product into at least clean oil, water, and gas components, the assembly comprising:
    a separator, the separator including a separator housing, the separator housing defining a separator interior, the separator configured having multiple manway openings, the separator for substantially separating the crude oil product into a water component, a clean oil component, and a gas component, the separator further providing gas removal, clean water removal, and clean oil component removal members engaged with the separator interior, for removing these components from the separator;
    a pipe for carrying the crude oil product from the oil well to the separator;
    a primary circuit, the primary circuit including a solar panel, a first non-water liquid heat transfer medium chosen to maintain a liquid state in the primary circuit, and a primary/secondary circuit heat exchanger, a primary circuit pump, and a first fluid flow pathway, the primary circuit pump for engaging the first fluid flow pathway for circulating the first heat transfer medium between the solar panel and the primary/secondary circuit heat exchanger;
    a secondary circuit comprising a buffer tank adapted to receive the primary/secondary heat exchanger into the interior thereof, a secondary circuit pump, a second non-water liquid heat transfer medium chosen to maintain a liquid state in the secondary circuit, an outlet pipe engaging the buffer tank, and an inlet pipe engaging the buffer tank;
    a first housing having a first housing interior and having a long axis, the first housing having a first housing cover, the first housing dimensioned for receipt through a first manway opening of the multiple manway openings and into the interior of the separator with the long axis of the first housing perpendicular to a vertical axis of the separator housing, the first cover dimensioned to engage the first manway opening; and
    a first heat exchanger dimensioned for receipt inside the first housing;
        wherein the secondary circuit pump circulates the second heat transfer medium through the buffer tank, the outlet pipe of the buffer tank, the first housing, the inlet pipe of the buffer tank, and the first heat exchanger;
        wherein the multiple manway openings are aligned one vertically above the other;

further including a second housing, the second housing having a second housing interior and a long axis, the second housing having a second housing cover, the second housing dimensioned for receipt through a second manway opening of the multiple manway openings into the interior of the separator with the long axis of the second housing perpendicular to the vertical axis of the separator; and a second heat exchanger dimensioned for receipt inside the second housing;

wherein the secondary pump circulates the second heat transfer medium through the second heat exchanger.

10. The assembly of claim 9, wherein the first and second housings contain a working fluid in contact with the first and second heat exchangers to help provide heat transfer from the first and the second heat exchanger to the interior of the separator.

11. The assembly of claim 10, further including a tubing to carry the second heat transfer medium between the first and second heat exchangers.

12. The assembly of claim 11, wherein the tubing connects the first and the second heat exchangers in series.

\* \* \* \* \*